US012291149B2

(12) United States Patent
Moriyama et al.

(10) Patent No.: US 12,291,149 B2
(45) Date of Patent: May 6, 2025

(54) DOOR MIRROR DEVICE

(71) Applicant: MAZDA MOTOR CORPORATION, Hiroshima (JP)

(72) Inventors: Yukihiro Moriyama, Hiroshima (JP); Eisuke Kuramoto, Hiroshima (JP); Masato Ikeda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 503 days.

(21) Appl. No.: 17/820,464

(22) Filed: Aug. 17, 2022

(65) Prior Publication Data
US 2023/0110322 A1 Apr. 13, 2023

(30) Foreign Application Priority Data
Oct. 13, 2021 (JP) ................. 2021-168305

(51) Int. Cl.
*B60R 1/074* (2006.01)
*B60R 1/072* (2006.01)
*B60W 10/30* (2006.01)

(52) U.S. Cl.
CPC ............ *B60R 1/074* (2013.01); *B60R 1/072* (2013.01); *B60W 10/30* (2013.01)

(58) Field of Classification Search
CPC ................. B60R 1/072; B60R 1/074
USPC .................................. 359/841, 877
See application file for complete search history.

(56) References Cited

U.S. PATENT DOCUMENTS

| 2,871,761 | A * | 2/1959 | Suyder .................... B60R 1/006 116/56 |
| 5,886,838 | A * | 3/1999 | Kuramoto ................. B60R 1/07 359/881 |
| 5,940,230 | A * | 8/1999 | Crandall ................. B60R 1/074 248/479 |
| 7,427,141 | B2 * | 9/2008 | Kim ........................ B60R 1/085 359/876 |
| 10,780,829 | B2 * | 9/2020 | Van .......................... B60R 1/074 |
| 11,981,262 | B2 * | 5/2024 | Moriyama .............. B60R 1/006 |
| 12,145,506 | B2 * | 11/2024 | Moriyama ............. B60J 5/0404 |
| 2006/0132282 | A1 * | 6/2006 | McCall ..................... B60R 1/12 340/5.2 |
| 2009/0122431 | A1 * | 5/2009 | Horii ........................ B60R 1/06 359/872 |
| 2017/0210297 | A1 * | 7/2017 | Kim ....................... G01S 17/931 |

(Continued)

FOREIGN PATENT DOCUMENTS

JP 2020-179680 A 11/2020

*Primary Examiner* — Ricky D Shafer
(74) *Attorney, Agent, or Firm* — Studebaker Brackett PLLC

(57) ABSTRACT

A door mirror device comprises a door-mirror body portion, a mirror base having a tip-end portion fixed to the door-mirror body portion, an electromotive rotational unit provided to rotate the door-mirror body portion and the mirror base between a mirror-use position and a mirror-storage position, and a control portion to control the electromotive rotational unit. The electromotive rotational unit is provided inside a side door. The control portion controls the electromotive rotational unit such that the door-mirror body portion and the mirror base are rotated in a prescribed minute range centered at the mirror-use position so as to change an angle of a mirror when a mirror-face adjusting signal is inputted.

9 Claims, 20 Drawing Sheets

(56) References Cited

U.S. PATENT DOCUMENTS

| | | |
|---|---|---|
| 2020/0339036 A1 | 10/2020 | Kenmochi et al. |
| 2023/0000177 A1* | 1/2023 | Weaver ................ A47G 11/002 |
| 2023/0110906 A1* | 4/2023 | Moriyama ............. B60J 5/0404 |
| | | 296/146.6 |
| 2023/0111823 A1* | 4/2023 | Moriyama ................. B60J 1/08 |
| | | 296/1.11 |

* cited by examiner

DOOR MIRROR DEVICE

BACKGROUND OF THE INVENTION

The present invention relates to a door mirror device.

Conventionally, a door mirror device which is provided with an electromotive rotational unit in order to automatically rotate a door mirror between a usable position and a storage position is known as described in Japanese Patent Laid-Open Publication No. 2020-179680 (US 2020/0339036 A1).

This door mirror device comprises a door-mirror body portion provided with a mirror, a mirror base protruding, in a vehicle width direction, from a side door, and the electromotive rotational unit and a mirror-face adjusting unit which are stored in the door-mirror body portion. The mirror base is a portion which has a base-end portion and a tip-end portion, extends in the vehicle width direction, and forms an arm portion of the door mirror. The base-end portion of the mirror base is fixed to the side door, and to the tip-end portion of the mirror base is attached the door-mirror body portion so as to rotate around a rotational axis extending in a vertical direction.

The door-mirror body portion is rotated at the tip-end portion of the mirror base by receiving a rotational drive force of the electromotive rotational unit stored therein, so that the door-mirror body portion is rotatable between the mirror-use position and the mirror-storage position. The mirror-use position is the position where the door-mirror body portion protrudes toward an outward side, in the vehicle width direction, from the tip-end portion of the mirror base and the mirror is visible from a cabin inside. Meanwhile, the mirror-storage position is the one where the door-mirror body portion extends substantially in parallel to the side door.

Further, the mirror-face adjusting unit stored in the door-mirror body portion minutely adjusts an angle of the mirror in a horizontal direction and in a vertical direction in a state where the door-mirror body portion takes the mirror-use position.

The above-described door mirror device is configured such that the base-end portion of the mirror base is fixed to the side door and the door-mirror body portion is rotated at the tip-end portion. Therefore, in a case of vehicle which is designed to require a sufficient length, in a width direction, of the mirror base, since the mirror base protrudes from a door panel to a certain degree even if the door-mirror body portion is rotated to the mirror-storage position, a vehicle width in a mirror-storage state is not reduced sufficiently, so that the vehicle's requirement of reducing the vehicle width in the mirror-storage state may not be met properly.

Further, since the electromotive rotational unit is stored inside the door-mirror body portion in the above-described device, a moment applied in a vertical direction which is generated at the electromotive rotational unit in proportion to the length of the mirror base becomes large, so that there is a problem that vibrations of the mirror generated during vehicle traveling may become improperly large.

Further, since the electromotive rotational unit is stored inside the door-mirror body portion, the longitudinal width (i.e., the width in a vehicle longitudinal direction) of the door-mirror body portion becomes large. Consequently, there is a concern that the visibility from the cabin inside may be hindered by the door-mirror body portion.

Meanwhile, while the above-described problem is solved in a case where the electromotive rotational unit and the mirror-face adjusting unit are removed from the door mirror, the door-mirror body portion needs to be stored manually or the mirror-face needs to be adjusted manually in this case, which may deteriorate the user convenience.

SUMMARY OF THE INVENTION

The present invention has been devised in view of the above-described problems, and an object of the present invention is to provide a door mirror device provided with the electromotive rotational unit which can attain reduction of the vehicle width in the mirror-storage state, suppression of the vibrations of the mirror during the vehicle traveling, improvement of the visibility from the cabin inside, and simplification of the mirror-face adjusting unit.

A door mirror device of the present invention comprises a door-mirror body portion provided with a mirror to obtain a rearward visual field of the vehicle, a mirror base having a tip-end portion fixed to the door-mirror body portion and a base-end portion provided away from the tip-end portion, a rotational support axis connected to the base-end portion of the mirror base and rotatably supporting the door-mirror body portion and the mirror base between a mirror-use position where the mirror is visible from a cabin inside and a mirror-storage position which is located on an inward side, in a vehicle width direction, of the mirror-use position, an electromotive rotational unit provided to rotate the door-mirror body portion and the mirror base between the mirror-use position and the mirror-storage position around an axis line of the rotational support axis, and a control portion to control the electromotive rotational unit, wherein the electromotive rotational unit is provided inside the side door, and the control portion controls the electromotive rotational unit such that the door-mirror body portion and the mirror base are rotated from the mirror-use position to the mirror-storage position when a storage active signal to start a storage operation is inputted, the door-mirror body portion and the mirror base are rotated from the mirror-storage position to the mirror-use position when a deployment active signal to start a deployment active operation is inputted, and the door-mirror body portion and the mirror base are rotated in a prescribed minute (small) range centered at the mirror-use position so as to change an angle of the mirror when a mirror-face adjusting signal to adjust a mirror face is inputted.

According to the present invention, the electromotive rotational unit rotates the mirror base together with the door-mirror base portion from the mirror-use position to the mirror-storage position in the door mirror device which comprises the door-mirror body portion provided with the mirror and the mirror base having the tip-end portion fixed to the door-mirror body portion. Therefore, in a state where the door-mirror body portion and the mirror base are rotated to the mirror-storage position, since respective protrusion quantities of the door-mirror body portion and the mirror base which protrude, in the vehicle width direction, from a side face of the side door can be made small, so that the vehicle width can be properly minimized.

Further, since the electromotive rotational unit, which is a heavy object in the door mirror device, is provided inside the side door, the vertical moment generated at the door mirror which is caused by a road-surface input during the vehicle traveling (i.e., vibrations or outer forces which are mainly generated in the vertical direction, which may be caused by an unevenness (concave/convex) of the road surface) can be decreased, so that the vibrations of the mirror can be suppressed.

Moreover, since the electromotive rotational unit is provided inside the side door, the longitudinal width of the door-mirror body portion can be shortened compared with a conventional door-mirror structure in which the electromotive rotational unit is stored inside the door-mirror body portion, so that the visibility from the cabin inside can be improved.

Additionally, the control portion controls the electromotive rotational unit such that the door-mirror body portion and the mirror base are rotated in the prescribed minute range centered at the mirror-use position so as to change the angle of the mirror when the mirror-face adjusting signal is inputted. Thereby, the mirror-face adjusting, in the horizontal direction, by means of the electromotive rotational unit becomes possible, so that the mirror-face adjusting unit which is conventionally provided at the door-mirror body portion can be simplified.

In the above-described door mirror device, it is preferable that the rotational support axis be provided to be inclined such that an upper side thereof is located on a vehicle forward side and on an outward side in a vehicle width direction.

According to this device, minute mirror-face adjusting in the vertical direction as well as in the horizontal direction can be attained only by rotating the door-mirror body portion and the mirror base around the axis line of the rotational support axis. That is, the mirror-face adjusting in the vertical direction can be the minimum. Further, an adjusting degree in the vertical direction in the mirror-face adjusting can be small, so that a movable range of the mirror becomes so small that the door-mirror body portion can be made properly thin (compact).

It is also preferable that the above-described device further comprise a memory portion to memorize positional information relating to a position of the door-mirror body portion and the mirror base after the door-mirror body portion and the mirror base have been rotated by the electromotive rotational unit in the prescribed minute range so as to change the angle of the mirror when the mirror-face adjusting signal is inputted to the control portion, wherein the control portion control the electromotive rotational unit such that the door-mirror body portion and the mirror base are located at a position corresponding to the positional information memorized by the memory portion when the door-mirror body portion and the mirror base are rotated from the mirror-storage position to the mirror-use position according to an input of the deployment active signal in a state where the door-mirror body portion and the mirror base take the mirror-storage position.

According to this device, the positional information relating to the position of the door-mirror body portion and the mirror base when the mirror-face adjusting is conducted is previously memorized by the memory portion, and when the deployment active signal is inputted next time, the control portion controls the electromotive rotational unit such that the door-mirror body portion and the mirror base are located at the position corresponding to the positional information memorized by the memory portion. This can save time and trouble for user's adjustment of the mirror face at each time of the mirror deployment, thereby improving the user convenience.

In the above-described door mirror device, it is preferable that the control portion control the electromotive rotational unit such that the door-mirror body portion and the mirror base are returned to a position corresponding to the positional information memorized by the memory portion in a case where a position of the door-mirror body portion and the mirror base is changed without being driven by the electromotive rotational unit.

According to this device, the door-mirror body portion can be automatically restored to its original position which is the position before its rotation in a case where the door-mirror body portion is rotated involuntarily, such as a case where an external force is applied to the door-mirror body portion. Consequently, it is unnecessary to increase a rotational resistance against the external force to rotate the door-mirror body portion like the conventional electromotive rotational unit, so that the rotational resistance of the electromotive rotational unit can be properly small.

In the above-described door mirror device, it is preferable that the above-described prescribed minute range correspond to a range of ±5 degrees centered at the mirror-use position. According to this device, a driver can properly adjust the mirror face within a range where a vehicle body in parking or a lane during vehicle traveling are visible for the driver through the mirror.

In the above-described door mirror device, it is preferable that the rotational support axis be fixed to the base end portion of the mirror base and rotatable together with the mirror base around the axis line of the rotational support axis when receiving a rotational drive force of the electromotive rotational unit.

According to this device, the rotation of the mirror base becomes possible only by rotating the rotational support axis by means of the rotational drive force of the electromotive rotational unit, thereby facilitating the door mirror device.

Thus, according to the above-described present invention, the reduction of the vehicle width in the mirror-storage state, the suppression of the vibrations of the mirror during the vehicle traveling, the improvement of the visibility from the cabin inside, and the simplification of the mirror-face adjusting unit can be attained.

The present invention will become apparent from the following description which refers to the accompanying drawings.

BRIEF DESCRIPTION OF THE DRAWINGS

FIG. 20A being the side view of the door mirror and FIG. 20B being the view of the door mirror, when viewed from the vehicle forward side.

DETAILED DESCRIPTION OF THE INVENTION

Hereafter, a preferable embodiment of the present invention will be described referring to the accompanying drawings.

Figure 1:
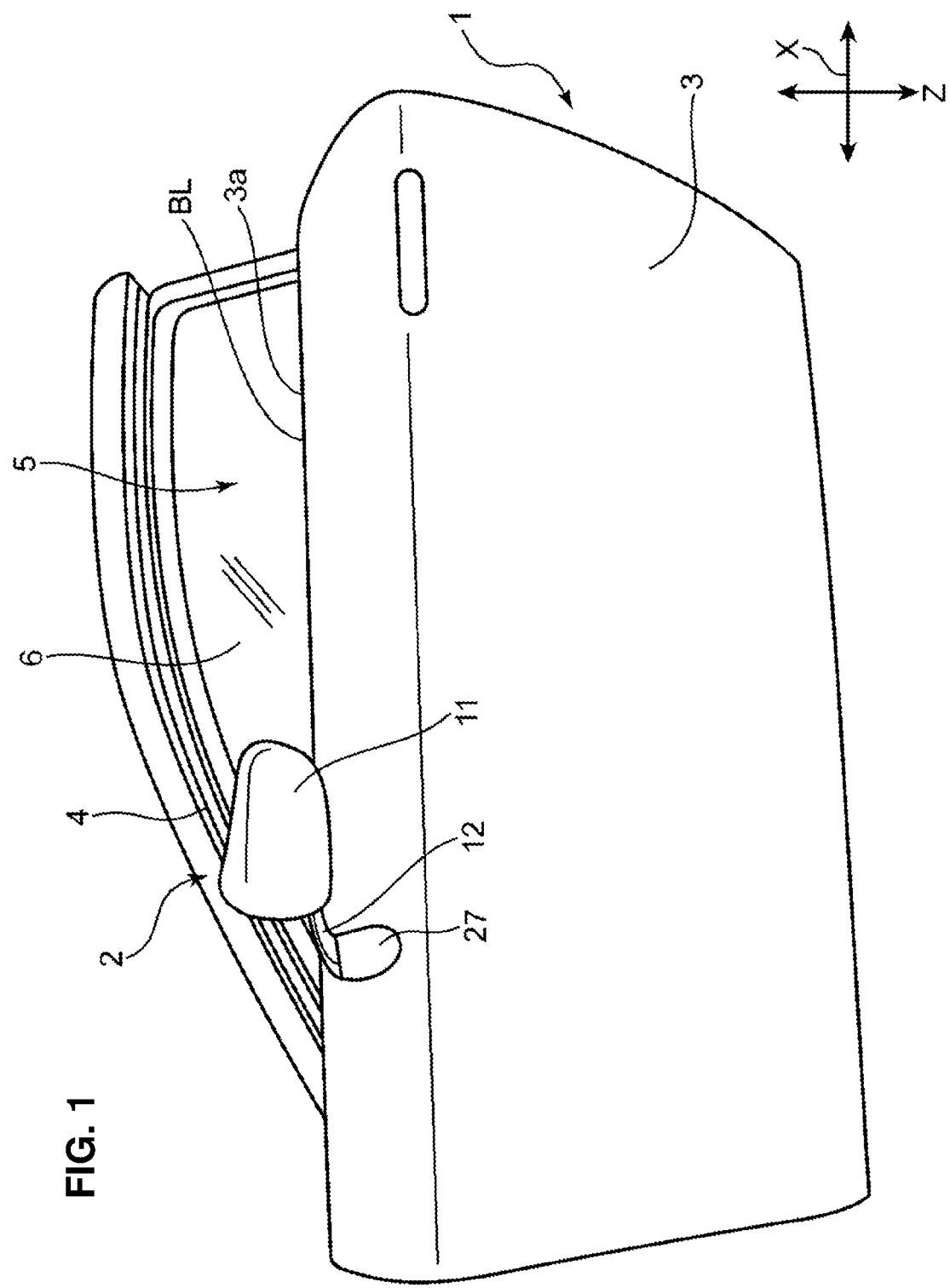
FIG. 1 is a perspective view showing a whole structure of a side door with a door mirror to which a door mirror structure according to an embodiment of the present invention is applied.
Figure 2:
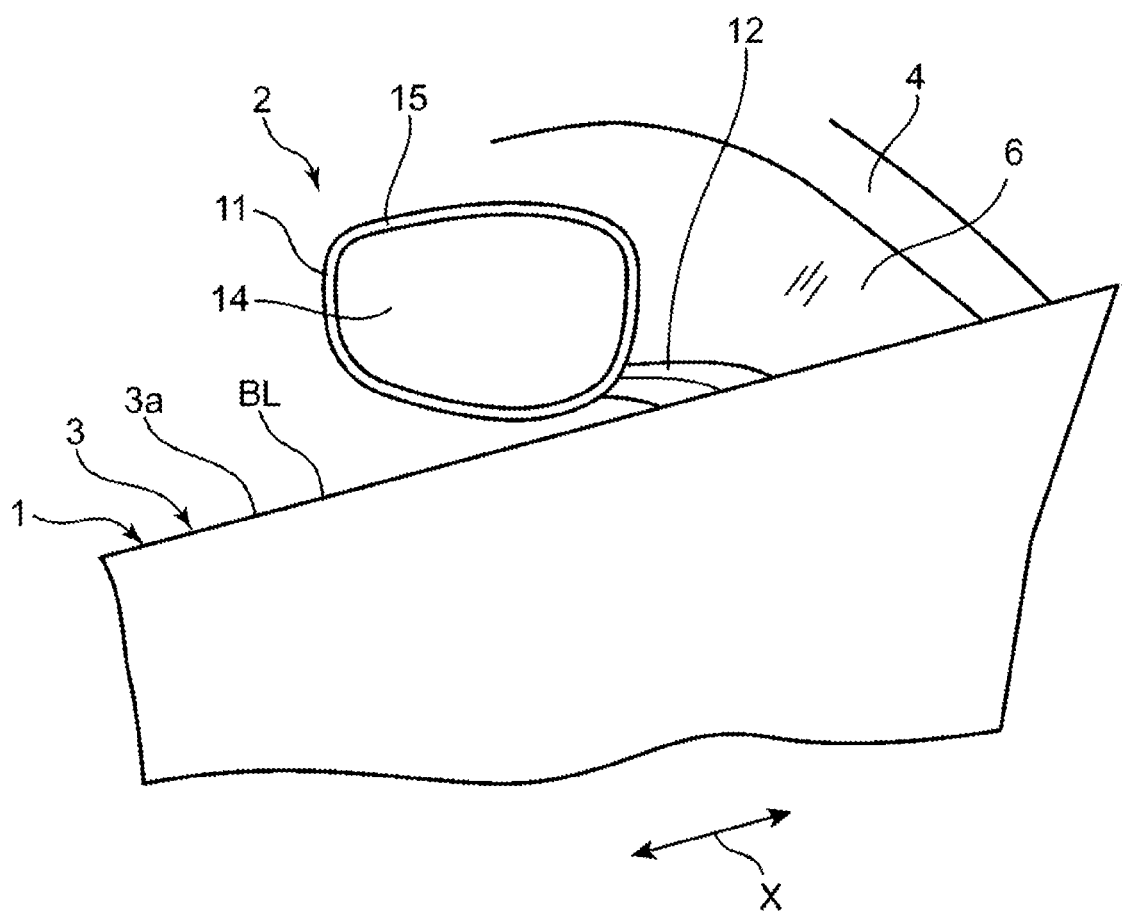
FIG. 2 is a view of the door mirror shown in FIG. 1, when viewed from a cabin inside.
Figure 3:
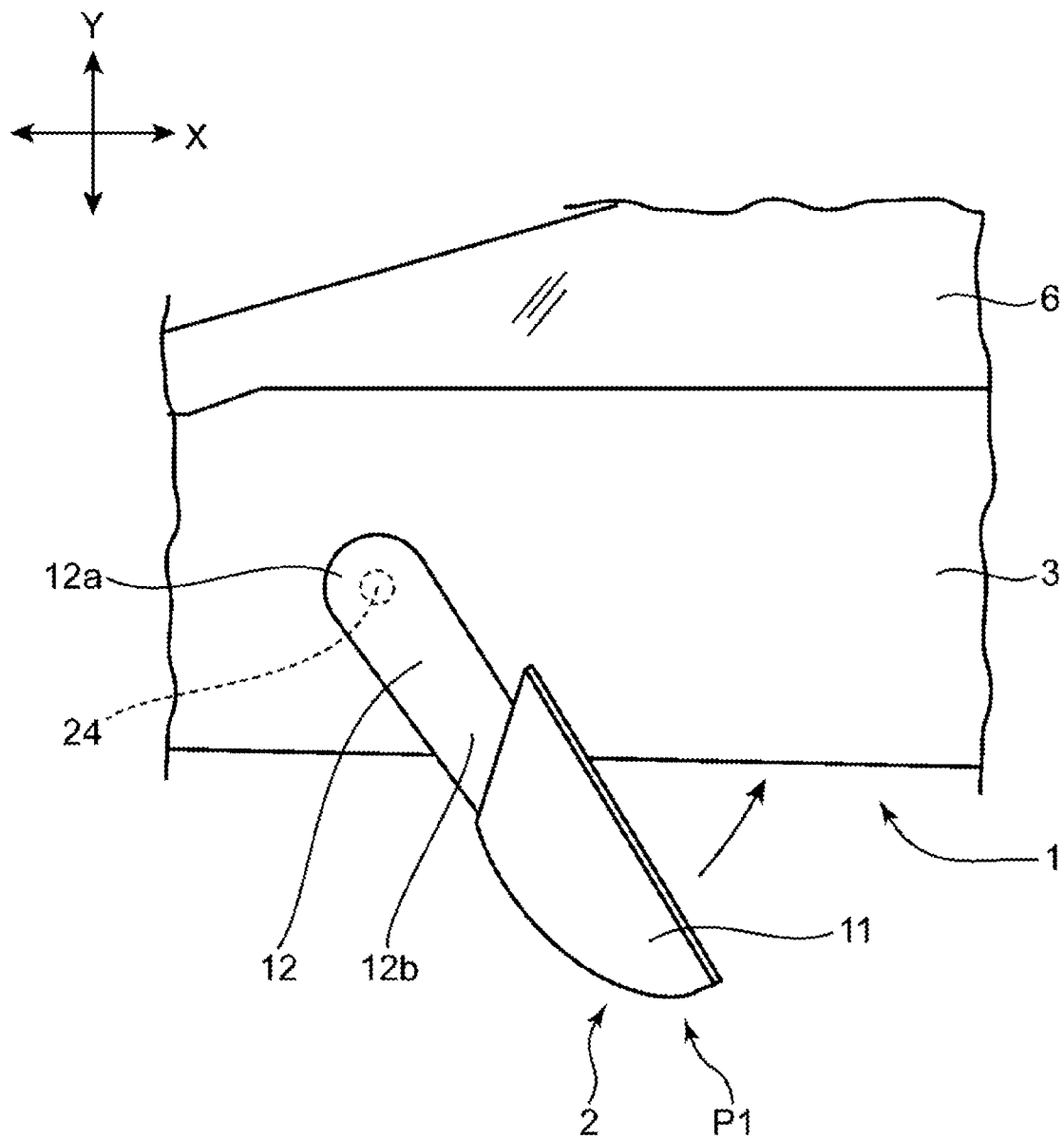
FIG. 3 is a plan view showing a state where the door mirror shown in FIG. 1 takes its use position.

FIGS. 1 and 2 show a side door 1 of a vehicle to which a door mirror device of the present invention is applied. The side door 1 is configured such that a door mirror 2 is arranged near a beltline BL at an upper end 3a of a door panel 3 and on a vehicle rearward side of an A pillar 4. A door glass 6 is arranged at a door opening portion 5 which is enclosed by the A pillar 4 and the beltline BL.

The door mirror device of the side door 1 of the vehicle according to the present embodiment is the one where the door mirror 2 which is storable in an electromotive manner is attached to the side door 1 as shown in FIGS. 1-7. Specifically, the door mirror device primarily comprises a door-mirror base portion 11 and a mirror base 12 which constitute the door mirror 2, an electromotive rotational unit 13 for rotating the door-mirror body portion 11 and the mirror base 12, a control unit 40 to control the electromotive rotational unit 13, and a user-operation detection portion 42 (see FIG. 7). The electromotive rotational unit 13 is provided inside the side door 1.

Further, the door mirror device of the present embodiment further comprises a rotational support axis 24 (see FIGS. 11-12) which rotatably supports the door-mirror body portion 11 and the mirror base 12, a beltline reinforcement 21 as a frame member positioned inside the side door 1, a support member 22 to fix the electromotive rotational unit 13 to the beltline reinforcement 21, and a cover member 27 which is provided at a vehicle outside of the side door 1.

Hereafter, respective structural elements of the door mirror device will be described in order.

As shown in FIG. 2, the door-mirror body portion 11 is provided with a mirror 14 to obtain a rearward visual field of the vehicle and a housing 15. The mirror 14, which is an optical mirror to reflect light, is held at a rearward face (specifically, a face which is directed toward a vehicle rearward side in a state where the mirror 14 takes a mirror-use position P1 shown in FIG. 3) of the housing 15. Further, inside the housing 15 of the door-mirror body portion 11 are stored an inner device 37 (see FIG. 12), such as a mirror-face adjusting unit for angle adjusting of a vertical direction Z and a vehicle width direction Y of the mirror 14 or a defrosting unit for the mirror 14.

The mirror base 12, which is a section to constitute an arm portion of the door mirror 2, comprises a tip-end portion 12b which is fixed to the door-mirror body portion 11 and a base-end portion 12a which is provided away from the tip-end portion 12b as shown in FIGS. 3-6.

Further specifically, the door-mirror body portion 11 is fixed to the tip-end portion 12b of the mirror base 12 such that the mirror 14 and the mirror base 12 are nearly parallel to each other.

The base-end portion 12a of the mirror base 12 is attached to the rotational support axis 24 such that the door-mirror body portion 11 and the mirror base 12 are rotatable between the mirror-use position P1 where the mirror is visible from the cabin inside and a mirror-storage position P2 which is located on the inward side, in the vehicle width direction Y, of the mirror-use position P1. Thereby, the door mirror 2 including the door-mirror base portion 11 and the mirror base 12 are configured to be stored from the mirror-use position P1 to the mirror-storage position P2 and also deployed from the mirror-storage position P2 to the mirror-use position P1.

Figure 4:
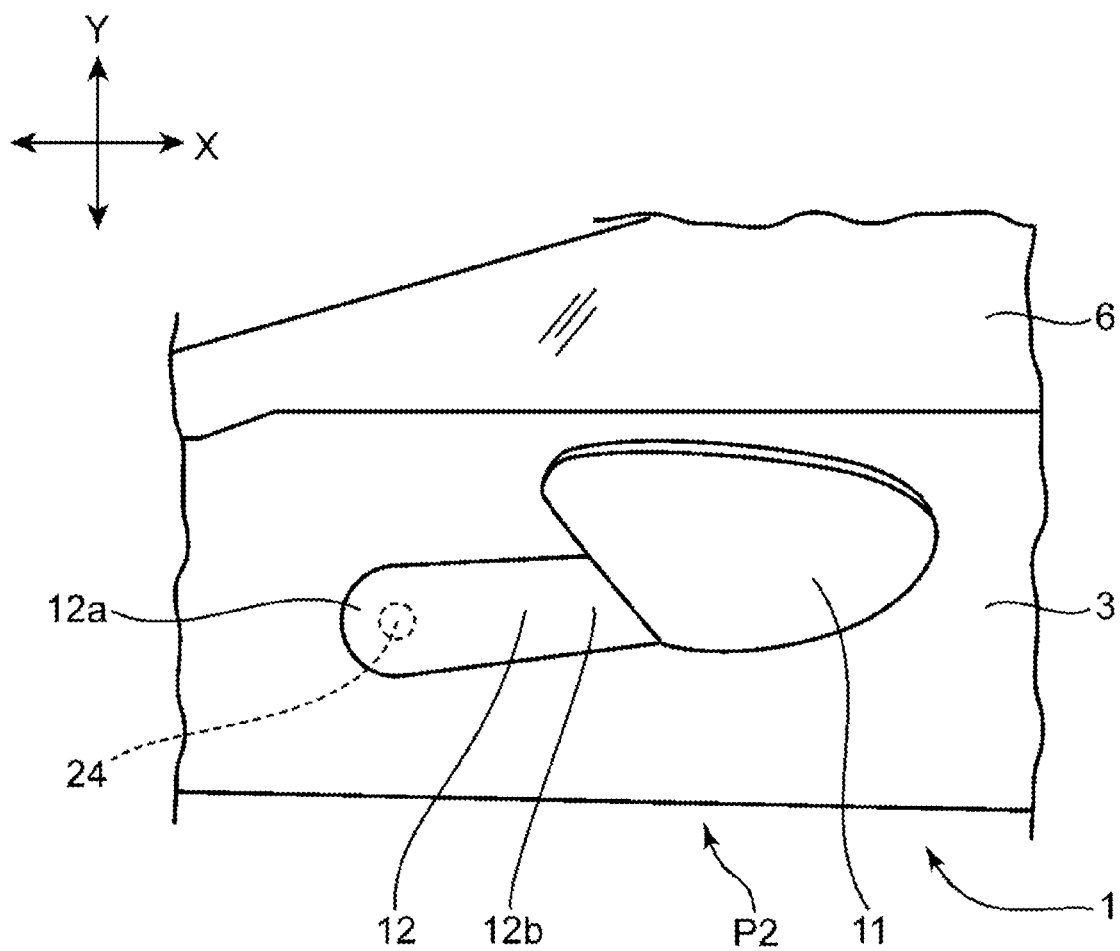
FIG. 4 is a plan view showing a state where the door mirror shown in FIG. 1 takes its storage position.
Figure 5:
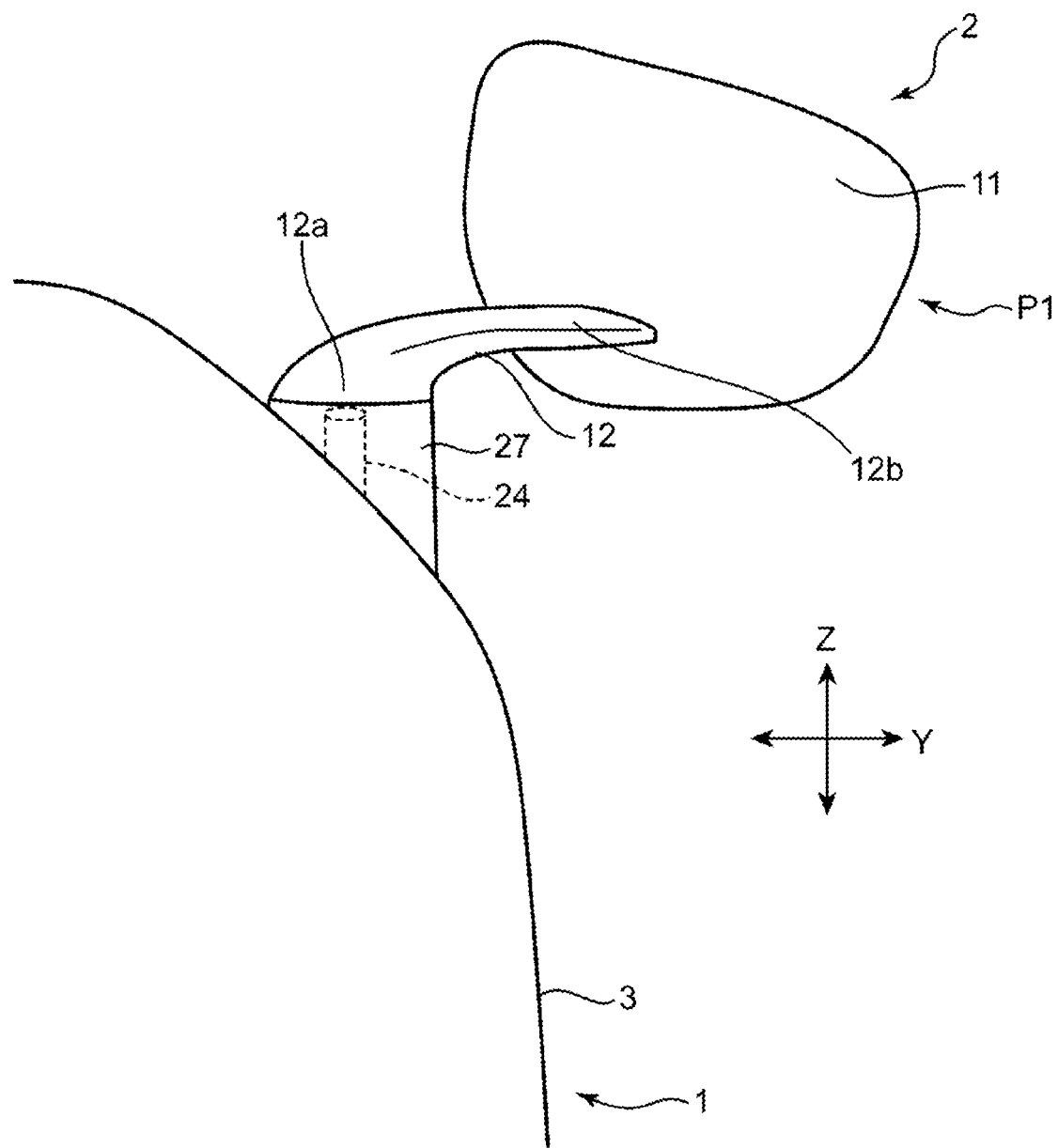
FIG. 5 is a view showing the state where the door mirror shown in FIG. 1 takes its use position, when viewed from a vehicle forward side.
Figure 6:
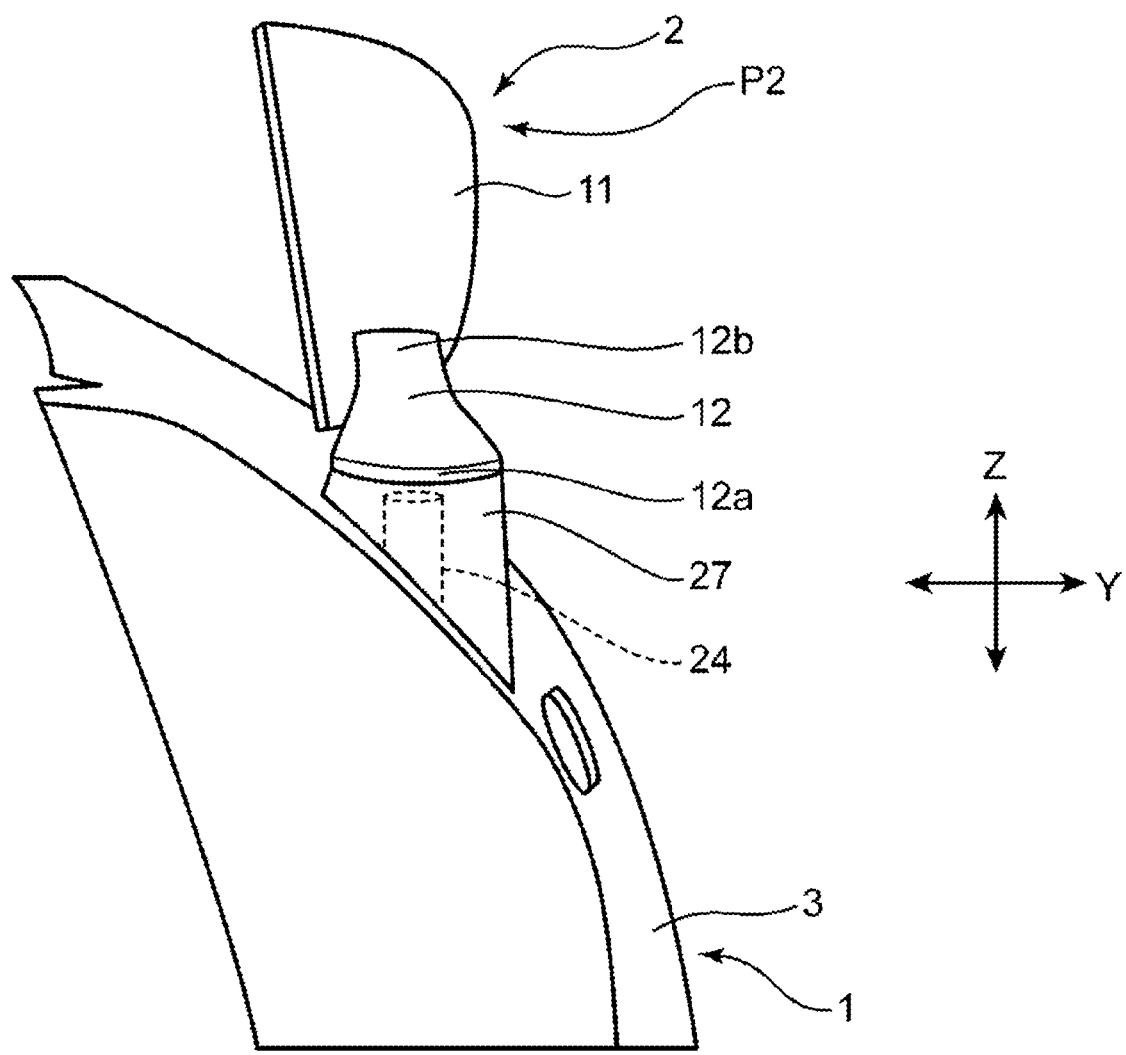
FIG. 6 is a view showing the state where the door mirror shown in FIG. 1 takes its storage position, when viewed from the vehicle forward side.

In the present embodiment, the rotational support axis 24 shown in FIGS. 9-12 is connected to the base-end portion 12a of the mirror base 12, and rotatably supports the door-mirror body portion 11 and the mirror base 12 between the mirror-use position P1 (see FIGS. 3 and 5) and the mirror-storage position P2 (see FIGS. 4 and 6).

The rotational support axis 24 extends from the base-end portion 12a into the side door 1 in an upright state and is rotated by the electromotive rotational unit 13.

Specifically, as shown in FIGS. 9-12, a penetration hole 26 is formed at the door panel 3 (outer panel) which constitutes an outside face of the side door 1. The rotational support axis 24 passes through the penetration hole 26 of the door panel 3 and is coaxially connected to an output axis 35 (see FIG. 12) described later of the electromotive rotational unit 13 which is arranged in a space portion 20 inside the side door 1.

Figure 12:
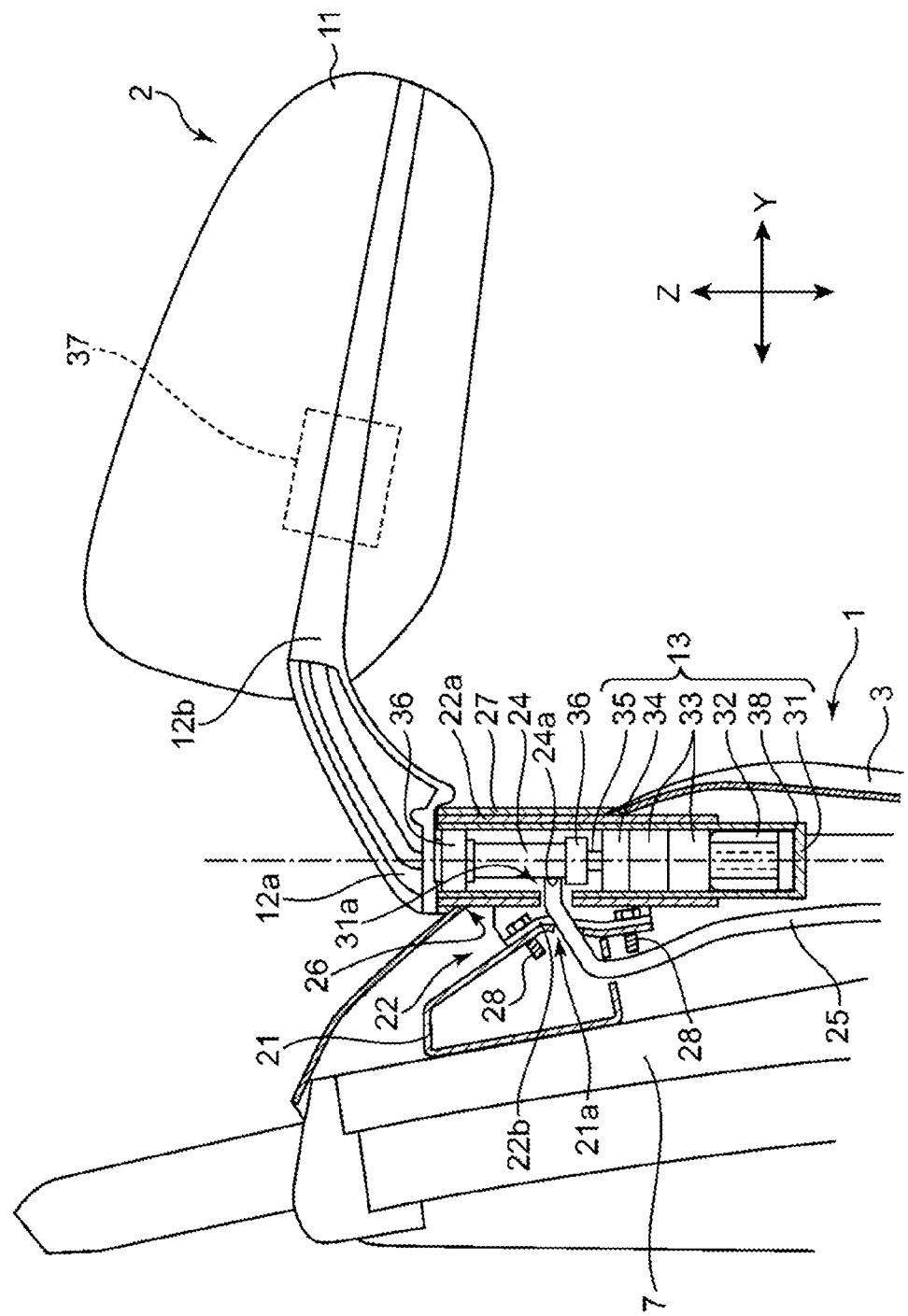
FIG. 12 is a sectional view taken along line XII-XII of FIG. 8, where the cover member is added.

The electromotive rotational unit 13 is configured to rotate the door-mirror body portion 11 and the mirror base 12 between the mirror-use position P1 and the mirror-storage position P2. Specifically, the electromotive rotational unit 13 comprises, as shown in FIG. 12, a casing 31, a motor 32, a reduction gear 33 to reduce a generation torque of the motor 32, a torque limiter 34, the output axis 35 to output a rotational drive force, and a rotational-number sensor 38 as a rotational-number detection portion to detect the rotational number of the motor 32. In the casing 31 are stored the motor 32, the reduction gear 33, the torque limiter 34, the output axis 35, and the rotational-number sensor 38. Further, the rotational support axis 24 and a journal 36 to rotationally support the rotational support axis 24 are also stored in the casing 31. Accordingly, the motor 32, the reduction gear 33, the torque limiter 34, the output axis 35, and the rotational-number sensor 38, which are primary structural elements of the electromotive rotational unit 13, are arranged on an axis line of the rotational support axis 24. The output axis 35 is connected to the rotational support axis 24 integrally rotationally.

Herein, in a case where an excessive torque is generated at the rotational support axis 24 when the motor 31 is driven, the torque limiter 34 cuts transmission of the torque, so that a load of the motor 32 can be suppressed.

A ball bearing or a roller bearing which can support the rotational support axis 24 with a small rotational resistance are preferable as the journal 36.

The electromotive rotational unit 13 is fixed to the beltline reinforcement 21 by the support member 22.

Figure 7:
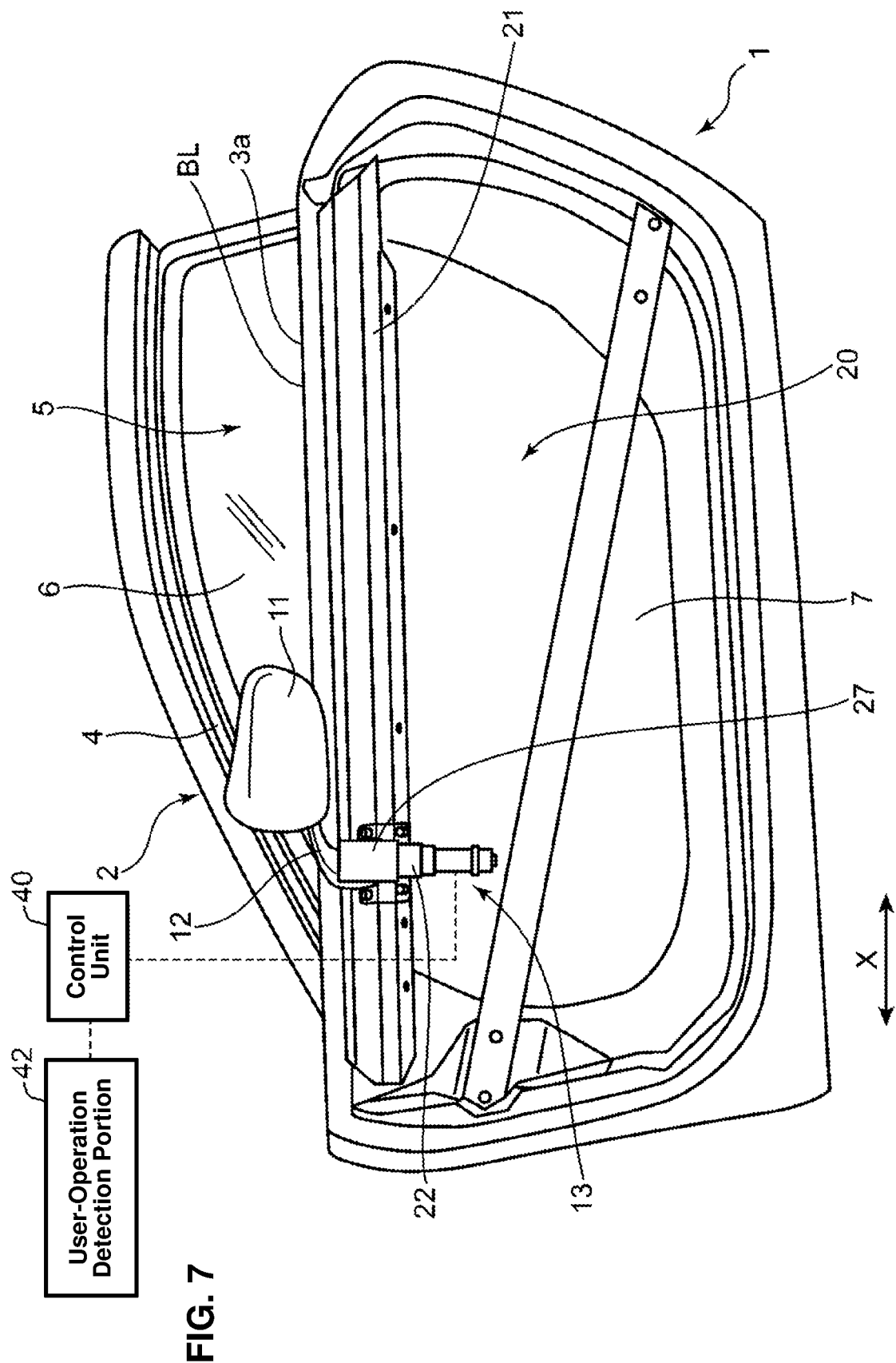
FIG. 7 is a view showing a state of the side door shown in FIG. 1 where a door outer is removed and a beltline reinforcement provided inside the side door is exposed.
Figure 8:
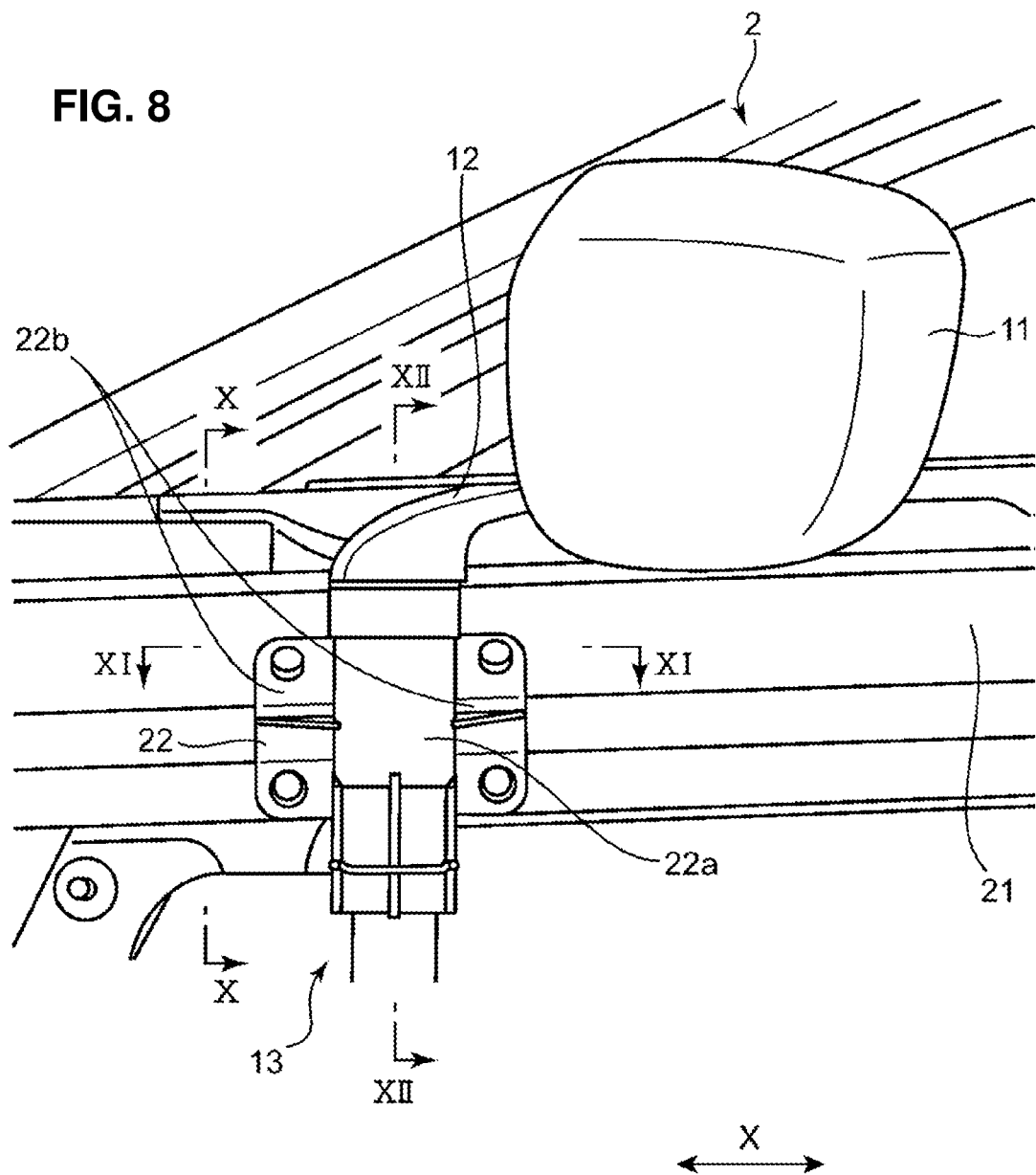
FIG. 8 is an enlarged view showing a state where the door mirror and an electromotive rotational unit are fixed to the beltline reinforcement shown in FIG. 7.
Figure 9:
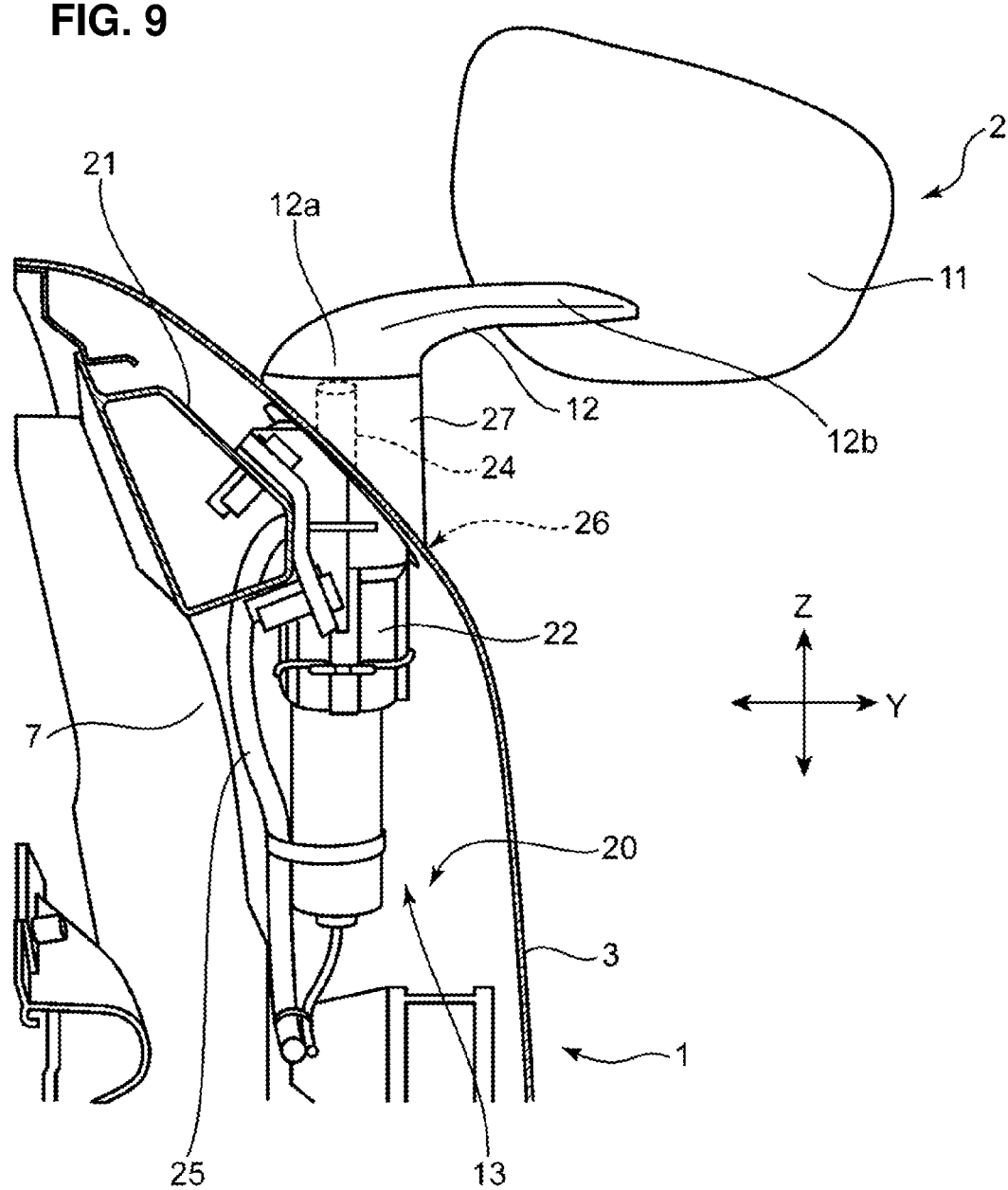
FIG. 9 is a sectional view taken along line X-X of FIG. 8, where a cover member is added.
Figure 10:
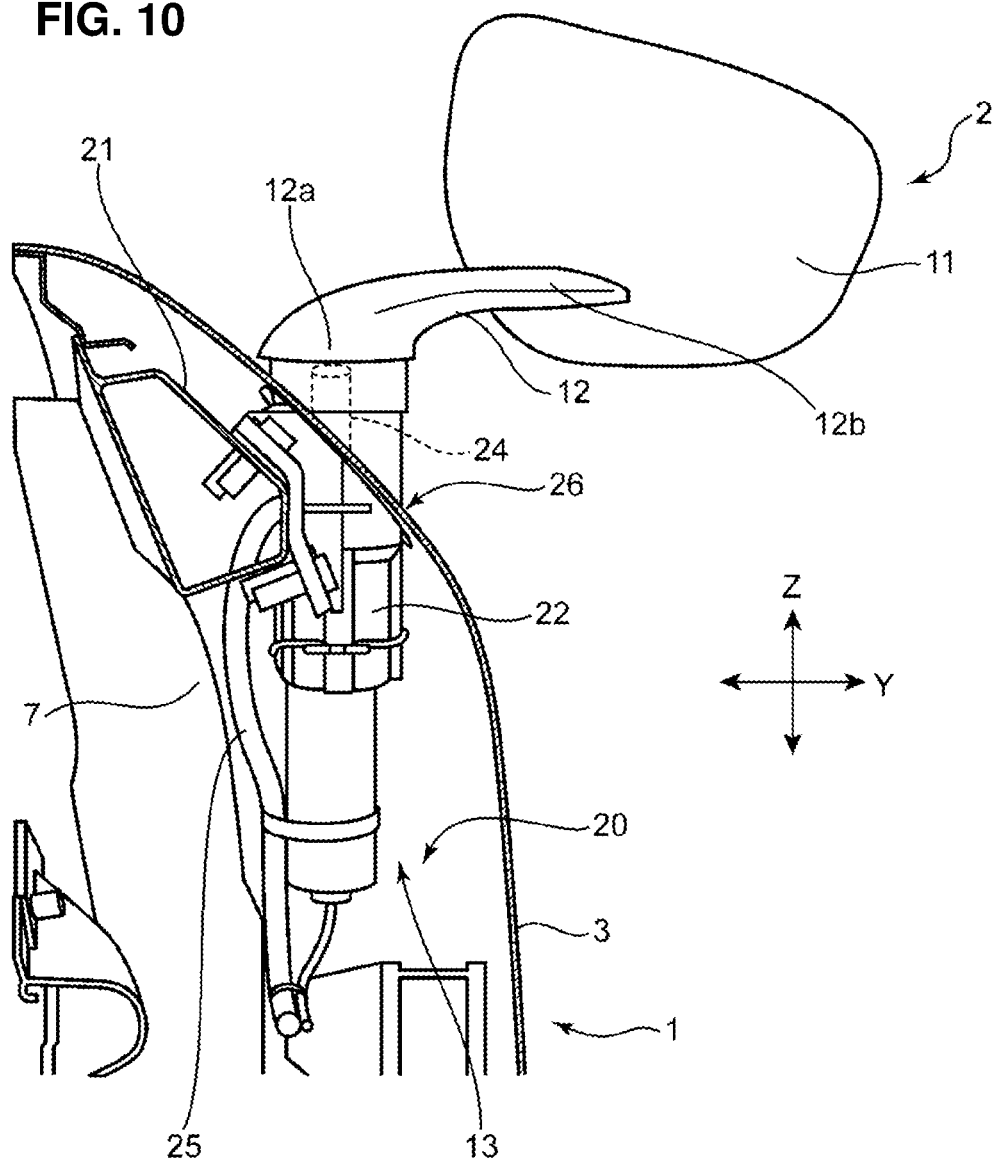
FIG. 10 is a sectional view taken along line X-X of FIG. 8.

The beltline reinforcement 21 is a frame member which is provided inside the side door 1 to constitute a frame of the side door 1. As shown in FIG. 7, the beltline reinforcement 21 is fixed to a door inner 7 (see FIGS. 7 and 12) provided inside the side door 1 such that it extends in the vehicle longitudinal direction X along the beltline BL at a window lower-end edge (i.e., a lower-end edge of the door opening portion 5 where the door glass 6 is arranged). The beltline reinforcement 21 of the present embodiment is made of an aluminum-made extrusion material.

Specifically, as shown in FIGS. 8-12, the support member 22 comprises a semi-cylindrical shaped holding portion 22a and a pair of fixation portions 22b which are provided at both sides, in the vehicle longitudinal direction X, of the holding portion 22a. The holding portion 22a holds the casing 31 where the electromotive rotational unit 13 and the rotational support axis 24 are stored. The pair of fixation portions 22b are fastened to the beltline reinforcement 21 by bolts 28.

Further, in the present embodiment, as shown in FIGS. 9-12, a harness 25 extends from the space portion 20 inside the side door 1 to the door-mirror body portion 11 and is electrically coupled to the inner device 37 (e.g., the mirror-face adjusting unit) provided inside the door-mirror body portion 11.

Figure 11:
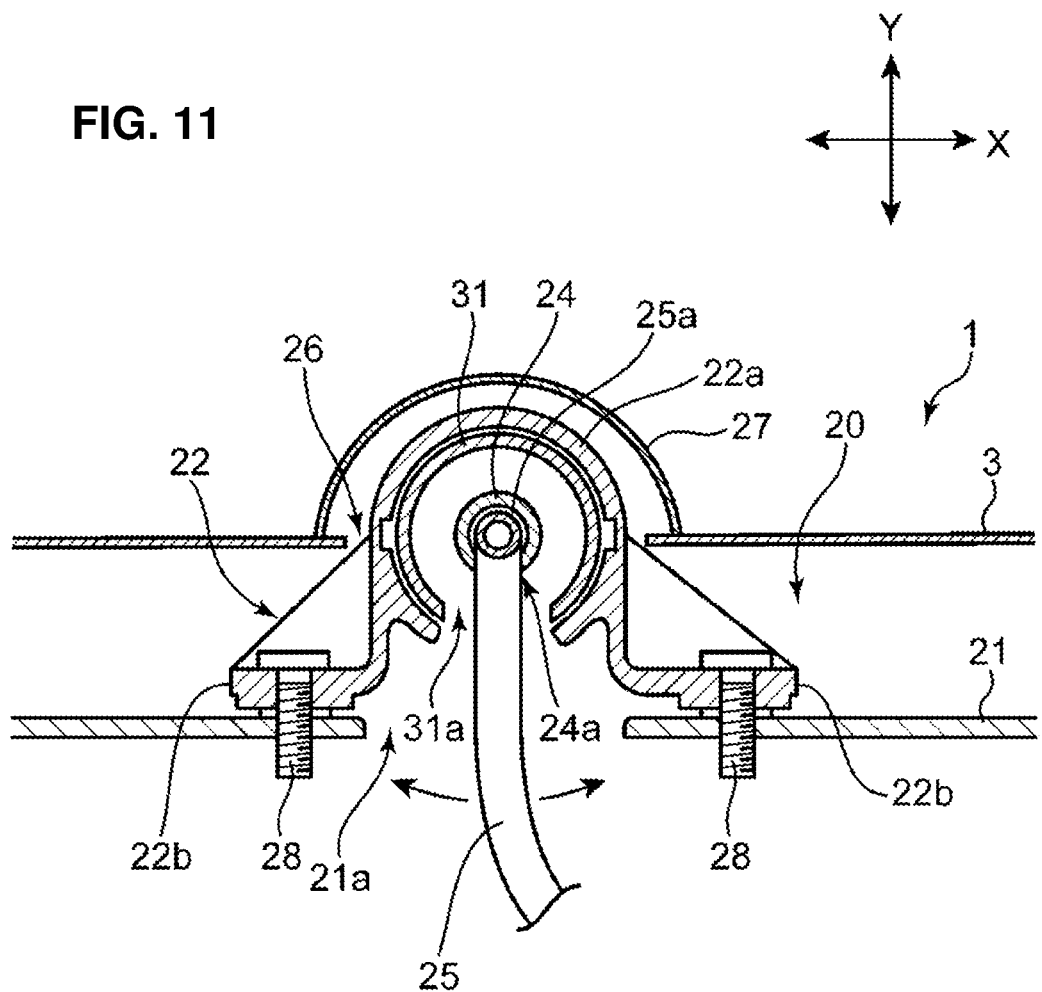
FIG. 11 is a sectional view taken along line XI-XI of FIG. 8.

Specifically, as shown in FIGS. 11 and 12, the beltline reinforcement 21 has a first opening 21a at a position which faces the holding portion 22a of the support member 22. Further, a second opening 31a is formed at the casing 31 of the electromotive rotational unit 13 at a position which faces the first opening 21a. Further, the rotational support axis 24 of the present embodiment is of a hollow cylindrical shape, and a third opening 24a is formed at its peripheral surface at a position which faces the second opening 31a. Accordingly, the harness 25 extends from the inside of the side door 1 to the inside of the rotational support axis 24 passing through the first opening 21a of the beltline reinforcement 21, the second opening 31a of the casing 31, and the third opening 24a of the rotational support axis 24 (see a portion 25a of the harness 25 shown in FIG. 11 which extends upwardly passing through the inside of the rotational support axis 24). Further, the harness 25 extends to the inner device 37 provided inside the door-mirror body portion 11 passing through the respective insides of the rotational support axis 24 and the mirror base 12, and is electrically coupled to the inner device 37.

Herein, in the door mirror device of the present embodiment, since the holding portion 22a of the support member 22 is of the semi-cylindrical shape, even if the harness 25 is arranged as described above, the casing 31 can be inserted into the holding portion 22a of the support member 22 from above without any interference of the harness 25 with the holding portion 22a.

The cover member 27 is configured to cover a gap between the penetration hole 26 and the rotational support axis 24 from the vehicle outside. Specifically, as shown in FIGS. 9-12, the casing 31 of the electromotive rotational unit 13 where the rotational support axis 24 is stored and the holding portion 22a of the support member 22 which covers the casing 31 are exposed to the vehicle outside through the penetration hole 26 of the door panel 3. The cover member 27 covers the casing 31 and the holding portion 22a which store the rotational support axis 24 therein from the outside at a position located below the base-end portion 12a of the mirror base 12 and also covers a gap between the penetration hole 26 and the holding portion 22a.

Figure 13:
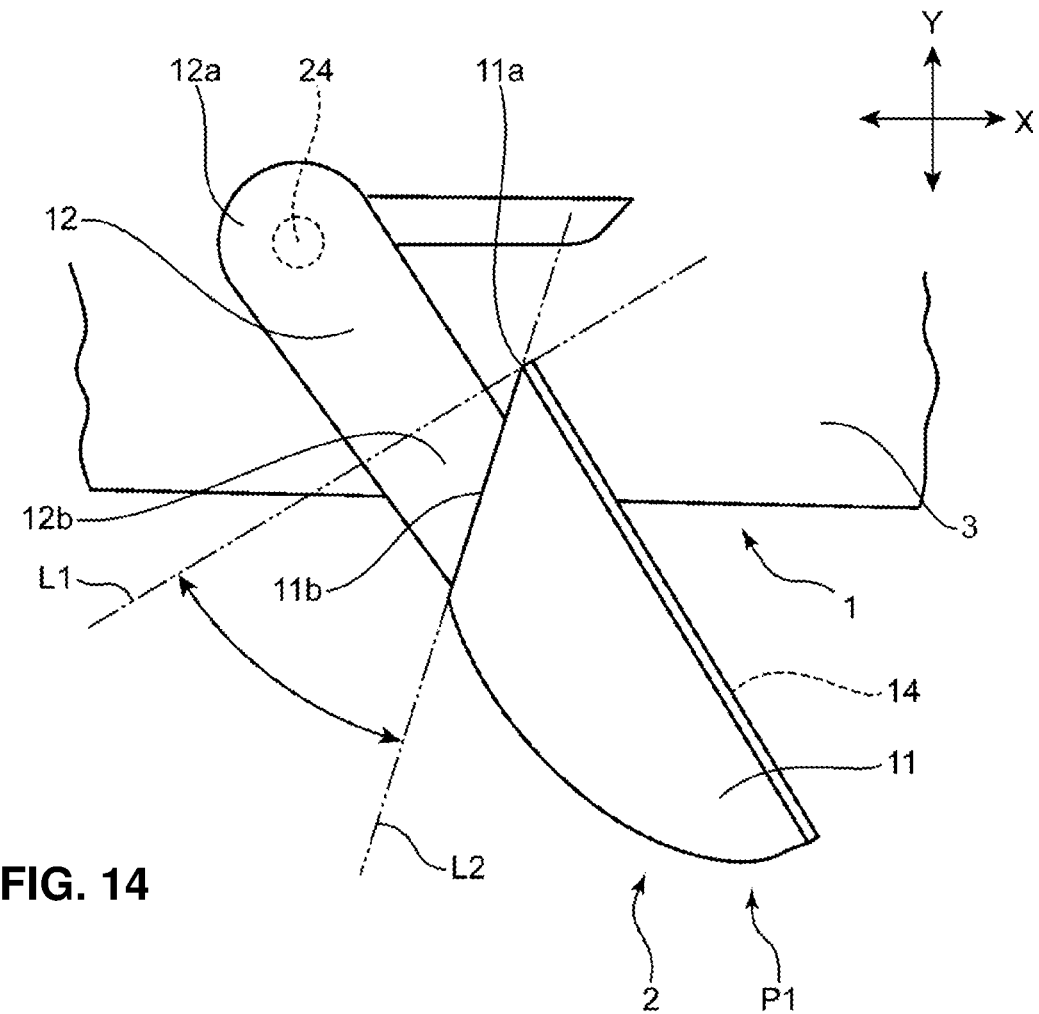
FIG. 13 is an explanatory diagram showing a state where an inner face of a door-mirror body portion is inclined toward a vehicle-outside relative to an imaginary line perpendicular to a surface of the mirror in the door mirror taking the mirror-use position shown in FIG. 3.

Further, as shown in FIG. 13, the door-mirror body portion 11 of the present embodiment is configured such that an inner face 11b of the door-mirror body portion 11 which faces the side door 1 is inclined toward the vehicle outside relative to an imaginary line L1 which passes through an inner-end portion 11a of the door-mirror body portion 11 perpendicularly to a surface of the mirror 14 in a plan view in the mirror-use position P1 (i.e., inclined in a direction away from the side door 1) for improvement of the visibility from the cabin inside. That is, the inner face 1ib of the door-mirror body portion 11 extends along an imaginary line L2 which extends obliquely relative to the imaginary line L1 toward the vehicle outside with its start point of the inner-end portion 11a of the door-mirror body portion 11. In other words, the door-mirror body portion 11 taking the mirror-use position P1 shown in FIG. 13 is configured such that the width, in the longitudinal direction X, of the door-mirror body portion 11 becomes narrower from a middle position, in the vehicle width direction Y, of the door-mirror body portion 11 toward the inner-end portion 11a which is positioned on the side of the side door 1 in the vehicle width direction Y (becomes a taper shape).

Figure 14:
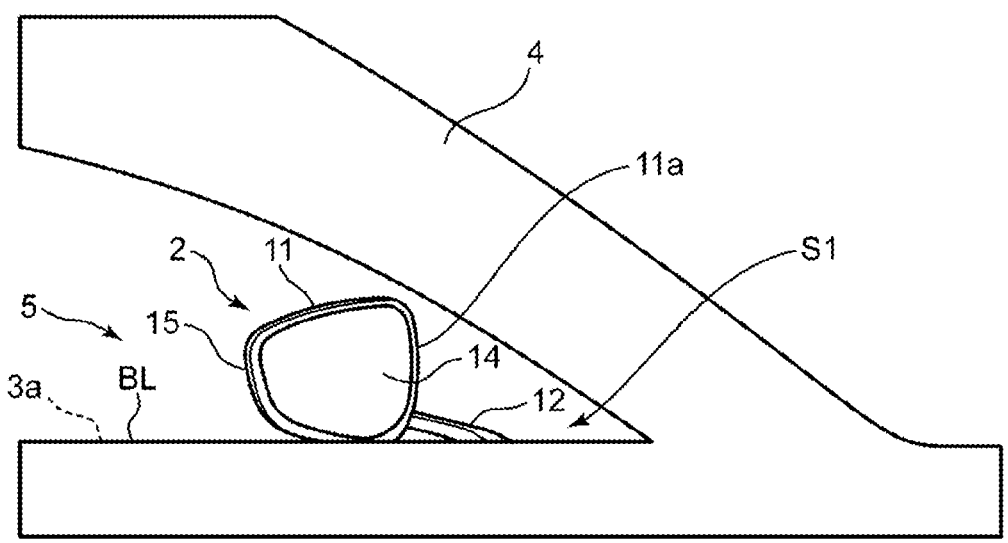
FIG. 14 is an explanatory diagram showing a state where the visibility from the cabin inside is improved because the inner face of the door-mirror body portion is not visible from the cabin inside in the door mirror taking the mirror-use position shown in FIG. 3.

By configuring (shaping) the door-mirror body portion 11 as described above, the visual field from the cabin inside is not interrupted by the inner face 1ib of the door-mirror body portion 11 as shown in FIG. 14. Thereby, a visual field of a space S1 which is located in front of the door-mirror body portion 11, i.e., the space S1 which is enclosed by the inner-end portion 11a of the door-mirror body portion 11, the A pillar 4, and the beltline BL, can be secured widely, so that the visibility is improved.

Figure 15:
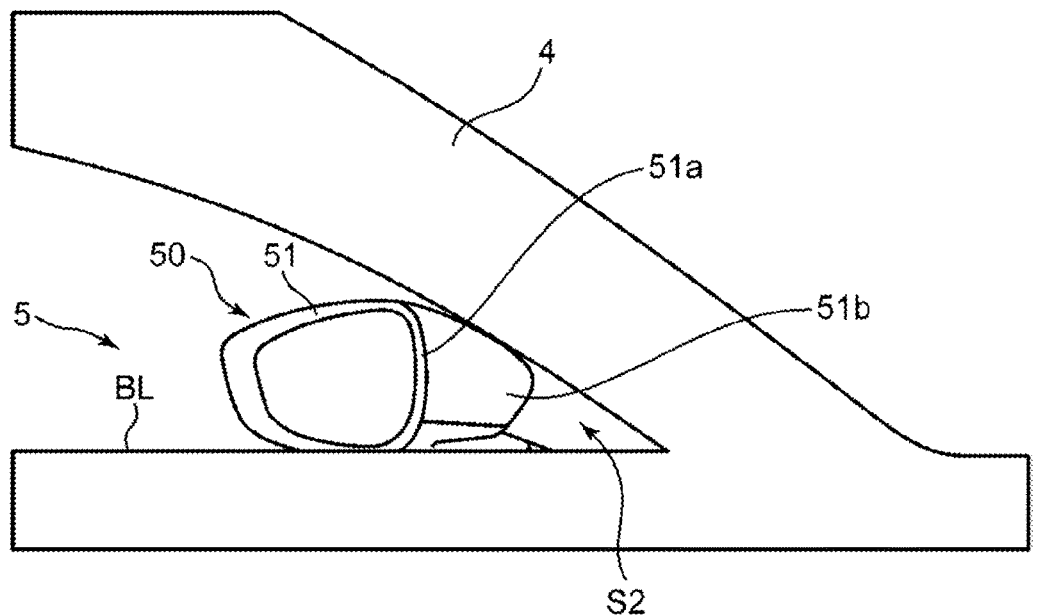
FIG. 15 is a diagram showing, as a comparative example of the present invention, a state of a conventional door mirror where since a longitudinal width of a door-mirror body portion which stores an electromotive rotational unit is large, an inner face of the door-mirror body portion is visible from the cabin inside, so that the visibility from the cabin inside is hindered.

For reference, in a structure in which the electromotive rotational unit (not illustrated) is stored at a door-mirror body portion 51 like a door mirror 50 which is shown in FIG. 15 as a comparative example, since the longitudinal width of the door-mirror body portion 51 becomes larger, an inner face 51b of the door-mirror body portion 51 becomes visible from the cabin inside. Accordingly, the space S2 which is located in front of the door-mirror-body portion 51, i.e., the space S2 which is enclosed by an inner-end portion 51a of the door-mirror body portion 51, the A pillar 4, and the beltline BL becomes narrower, so that it is apparent that the visibility is deteriorated.

[Description of Control System]

Next, a control system of the door mirror device of the present embodiment will be described.

Figure 16:
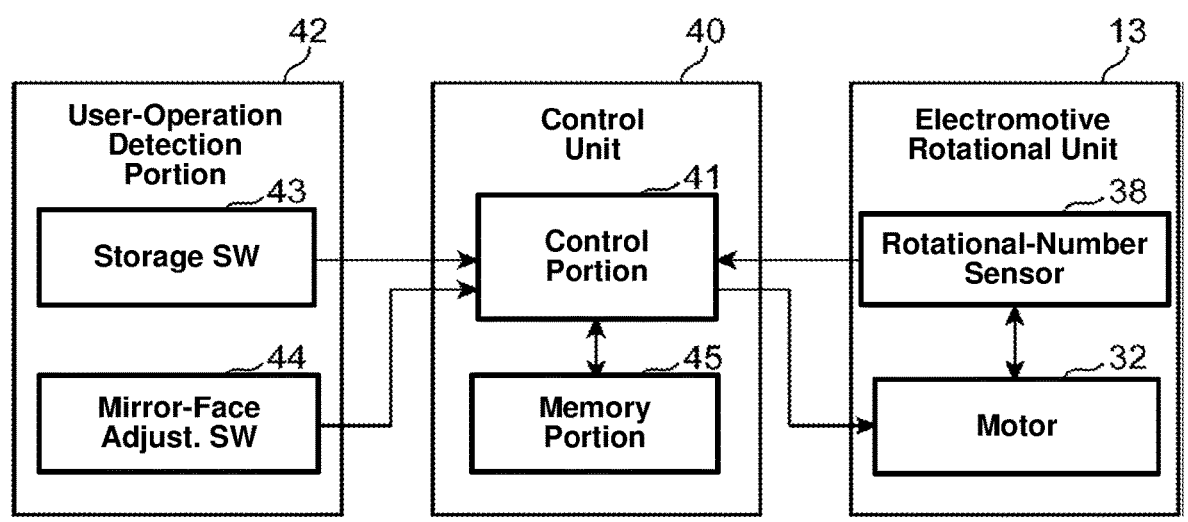
FIG. 16 is a block diagram showing a system structure in the door mirror device shown in FIG. 1.

The door mirror device of the present embodiment comprises three structural elements as the control system, i.e., the electromotive rotational unit 13, the control unit 40, and the user-operation detection portion 42 as shown in FIGS. 7 and 16.

As shown in FIG. 16, the electromotive rotational unit 13 comprises the motor 32 and the rotational-number sensor 38 as the rotational-number detection portion to detect the rotational number of the motor 32 as described above. Herein, while the rotational-number sensor 38 is included in the electromotive rotational unit 13 in the present embodiment, the present invention is not limited to this structure as long as the rotational-number sensor is provided at the door mirror device.

The control unit 40 comprises a control portion 41 to control the electromotive rotational unit 13 (specifically, the motor 32) and a memory portion 45.

The user-operation detection portion 42 comprises a storage switch 43 and a mirror-face adjustment switch 44. The storage switch 43 selects either one of a storage operation and a deployment operation of the door mirror 2 (the door-mirror body portion 11 and the mirror base 12), and outputs a storage active signal to start the storage operation or a deployment active signal to start the deployment operation to the control portion 41. The mirror-face adjustment switch 44 is the switch to minutely adjust an angle of the mirror 14 from the prescribed mirror-use position P1 (set position) in a horizontal direction at the request of a user, i.e., the switch for horizontal-directional mirror-face adjusting, and outputs a mirror-face adjusting signal for mirror-face adjusting to the control portion 41. Any type of switch, such as a dial, button, or slide type of switch, may be applied to the mirror-face adjustment switch 44 as long as this can output the mirror-face adjusting signal to command an angle change toward a vehicle forward side or a vehicle rearward side at prescribed angle's degree intervals (e.g., a signal at 0.1-1 degree intervals) in order to minutely adjust an inclination angle of the mirror 14 relative to the prescribed mirror-use position P1 (set position) in a plan view.

The control portion 41 controls the electromotive rotational unit 13 such that the door mirror 2 (the door-mirror body portion 11 and the mirror base 12) are rotated from the mirror-use position P1 to the mirror-storage position P2 when the storage active signal from the storage switch 43 is inputted. Further, the control portion 41 controls the electromotive rotational unit 13 such that the door mirror 2 is rotated from the mirror-storage position P2 to the mirror-use position P1 when the deployment active signal from the storage switch 43 is inputted. Moreover, the control portion 41 controls the electromotive rotational unit 13 such that the angle of the mirror 14 is changed by rotating the door mirror 2 (the door-mirror body portion 11 and the mirror base 12) in a prescribed minute (small) range centered at the mirror-use position P1 when the mirror-face adjusting signal from the mirror-face adjustment switch 44 is inputted.

The "prescribed minute range" in the present invention means the range which is sufficiently smaller than a range of rotational angle of the door mirror 2 from the mirror-storage position P2 to the mirror-use position P1 (for example, 1-20% of a whole rotational-angle range of the above-described positions P1-P2). It is preferable that this prescribed minute range correspond to a range of ±5 degrees centered at the mirror-use position P1 (set position).

The memory portion 45 memorizes positional information relating to the position of the door mirror 2. Specifically, the memory portion 45 memorizes the positional information relating to the position of the door mirror 2 which is based on the rotational number of the motor 32 after the door mirror 2 has been rotated by the electromotive rotational unit 13 in the above-described prescribed minute range so as to change the angle of the door mirror 2 when the mirror-face adjusting signal is inputted to the control portion 41. Herein, the above-described positional information is not limited to the one based on the rotational number of the motor 32 but this positional information may be based on any other parameter, such as a rotational angle of the output axis 35 of the electromotive rotational unit 13 or the rotational support axis 24.

[Description of Control Flowchart]

Hereafter, steps of respective operations of mirror storing/deploying, mirror-face adjusting, and mirror-angle maintaining in the door mirror device of the present embodiment will be described referring to a control flowchart shown in FIG. 17.

<Mirror Storing>

First, the control portion 41 determines whether the storage active signal from the storage switch 43 is detected in a state where the door mirror 2 (the door-mirror body portion 11 and the mirror base 12) takes the mirror-use position P1 (step S1).

In a case where the storage active signal is detected, the following steps S2-S10 relating to the "mirror storing" are executed in order to conduct normal mirror's storing/deploying. First, in the step S2, the control portion 41 makes the memory portion 45 memorize the mirror positional information of the rotational-number sensor 38 (specifically, the positional information relating to the position of the door mirror 2 which is based on the rotational number of the motor 32 detected by the rotational-number sensor 38). Next, in the step S3, the control portion 41 starts energizing of the motor 32 for the storing and continues this energizing until it is detected that the motor 32 gets locked at the mirror-storage position P2 (step S4), and this energizing of the motor 32 is stopped after the locking detection of the motor 32. Thereby, the door mirror 2 is rotated to the mirror-storage position P2 by the electromotive rotational unit 13 and then stopped.

Then, in a case where the deployment active signal from the storage switch 43 is detected (in a case of YES in the step S6), the control portion 41 starts energizing of the motor 32 for the deploying (step S7), and also detects the mirror position by detecting the rotational number of the motor 32 with the rotational-number sensor 38 (step S8). Then, in a case where it matches the mirror position memorized by the memory portion 45 (in a case of YES in the step S9), the control portion 41 stops the energizing of the motor 32 (step S10), and a control sequence returns to the step S1, maintaining the deployment state of the door mirror 2. Thereby, the electromotive rotational unit 13 can rotate the door mirror 2 to a position which matches the mirror positional information memorized by the memory portion 45 and make a stop there.

<Mirror-Face Adjusting>

Meanwhile, in a case where the control portion 41 does not detect the storage active signal in the step S1 (in a case NO in the step S1), the control sequence proceeds to step S11, where it is determined whether the mirror-face adjusting signal caused by the mirror-face adjustment (adjustment SW) switch 44 is detected. In a case where the mirror-face adjusting signal is detected (in a case of YES in the step S11), the following steps S12-S17 relating to the "mirror-face adjusting" are executed in order to conduct the mirror-face adjusting of the door mirror 2. First, in the step S12, the control portion 41 starts the energizing of the motor 32, and in the next step S13, the rotational number of the motor 32 is detected by the rotational-number sensor 38 and thereby the mirror position is detected. This detection of the mirror position is continued until the operation of the mirror-face adjustment switch 44 is finished in the step S14. When the operation of the mirror-face adjustment switch 44 is finished (in a case of YES in the step S14), the control portion 41 stops the energizing of the motor 32 (step S15). Thereby, the mirror face of the door mirror 2 is adjusted to the user's desired position by the electromotive rotational unit 13 and stopped there. Then, the mirror position is detected by the rotational-number sensor 38 in the step S16, the mirror positional information of the rotational-number sensor 38 is memorized by the memory portion 45 in the step S17, similarly to the step S2, and after this, the control sequence returns to the step S1, maintaining the deployment state of the door mirror 2 after the mirror-face adjusting.

<Mirror-Angle Maintaining>

Meanwhile, in a case where the mirror-face adjusting signal from the mirror-face adjustment switch 44 is not detected in the step S11 (in a case NO in the step S11), the following steps S21-S26 for mirror-angle maintaining of the door mirror 2 are executed. First, in the step S21, the mirror position is detected by the rotational-number sensor 38. Next, the control portion 41 determines whether the door mirror 2 is moved from the position memorized by the memory portion 45, and the control sequence returns to the step S1 in a case where the door mirror 2 is not moved. Meanwhile, in a case where the door mirror 2 is moved, the control sequence proceeds to the step S23, where the motor 32 is driven so as to move the door mirror 2 in a direction returning to the memorized position in order to execute an active control. Then, the mirror position is detected by the rotational-number sensor 38 in the step S24. It is determined in the step S25 whether the position of the door mirror 2 matches the memorized position, and in a case of no matching, the steps S23 and S24 are repeated. In a case where the position of the door mirror 2 matches the memorized position, the energizing of the motor 32 is stopped in the step S26, and then the control sequence returns to the step S1, maintaining the deployment state of the door mirror 2 with the mirror position memorized by the memory portion 45.

[Description of Mirror-Face Adjusting]

Figure 17:
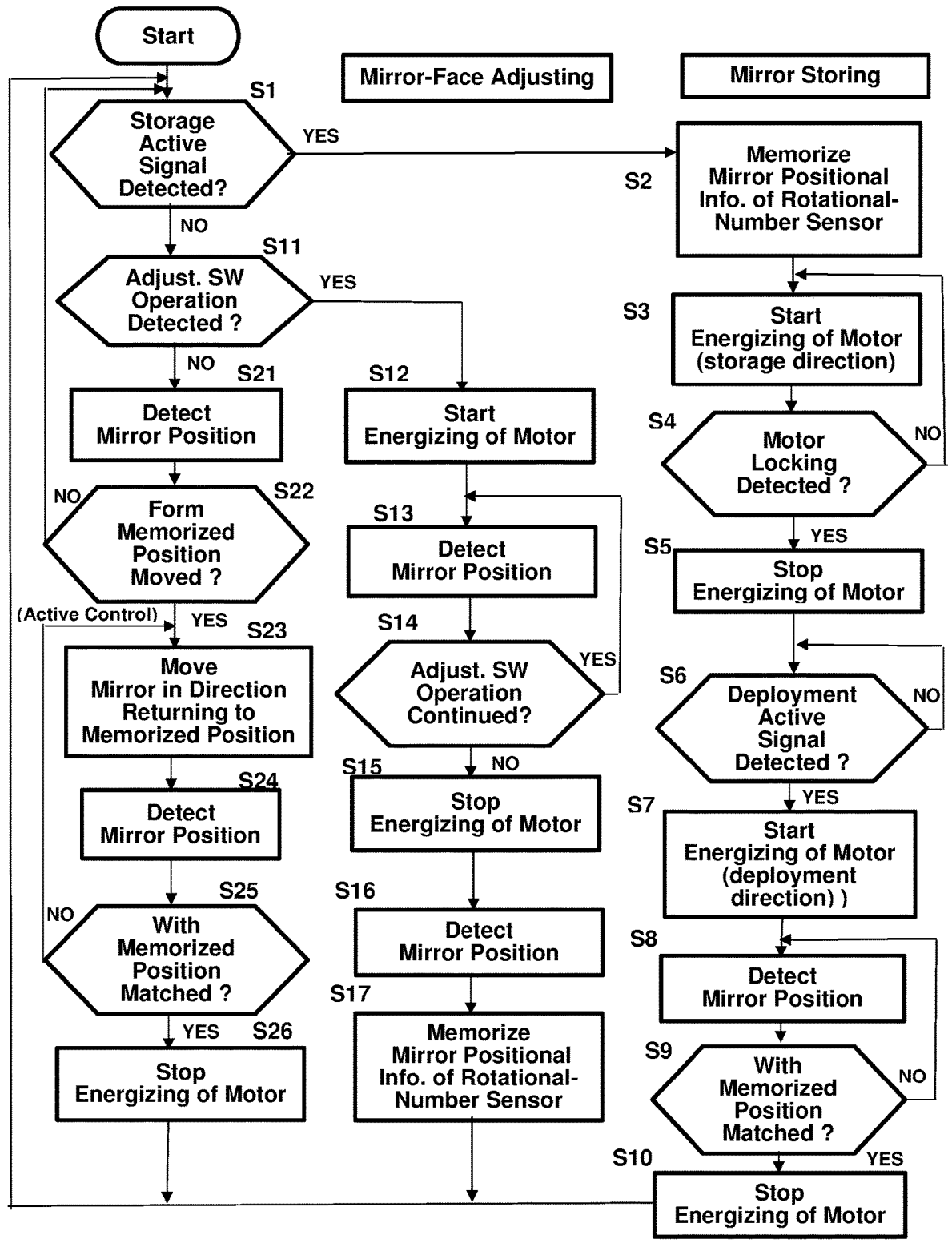
FIG. 17 is a control flowchart relating to respective operations of mirror storing/deploying, mirror-face adjusting, and mirror-angle maintaining in the door mirror device shown in FIG. 1.
Figure 18:
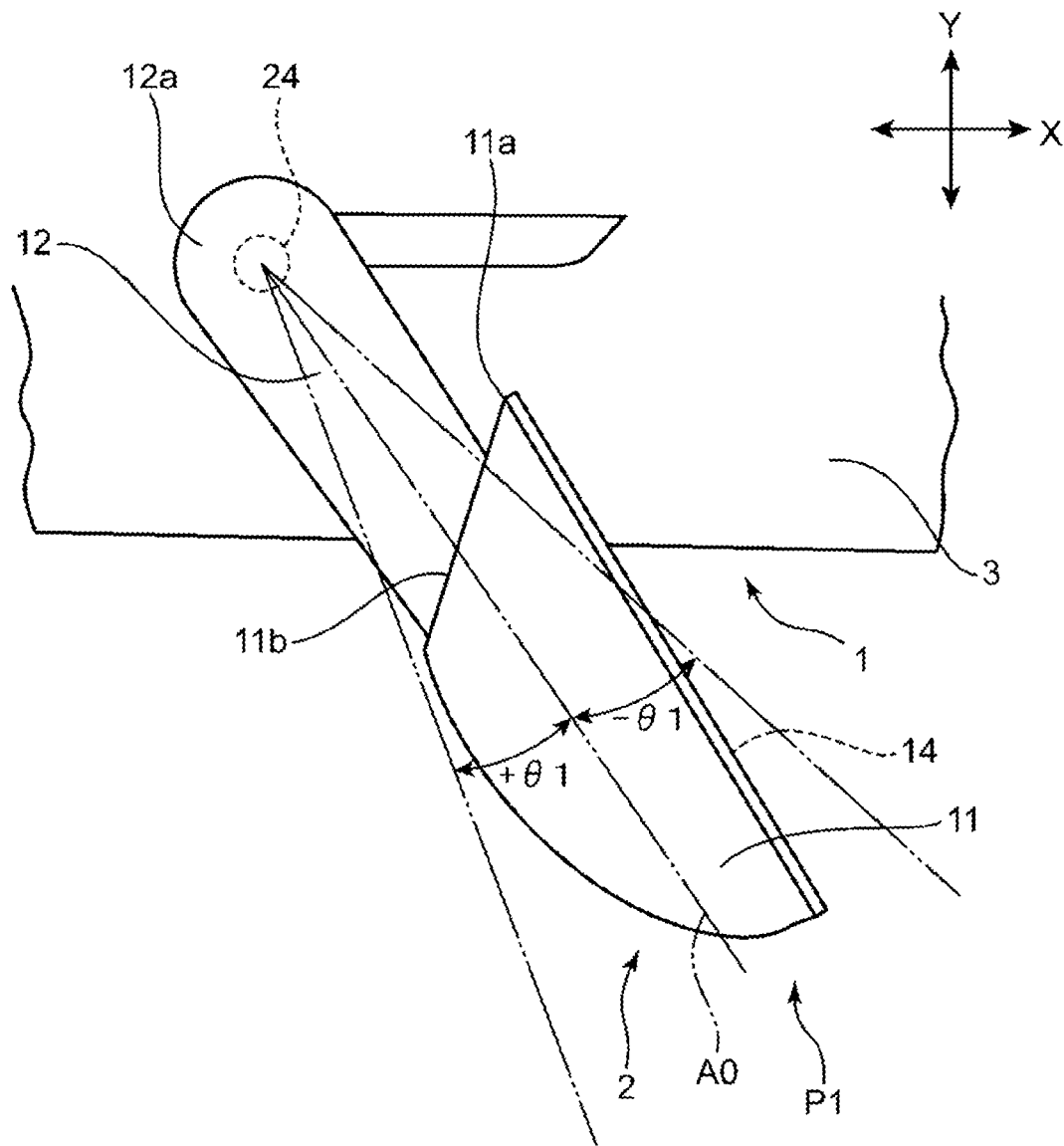
FIG. 18 is an explanatory diagram showing a prescribed minute range of a mirror-face adjusting in the door mirror device shown in FIG. 1.

According to the present embodiment, the angle of the mirror 14 can be changed by rotating the door mirror 2 (the door-mirror body portion 11 and the mirror base 12) in the horizontal direction around the rotational support axis 24 in the minute range±θ1 degrees of a standard line A0, which is centered at the mirror-use position P1 (set position), by means of the control portion 41 executing the steps S11-S17 shown in FIG. 17 for the mirror-face adjusting of the door mirror 2 as shown in FIG. 18.

Figure 19:
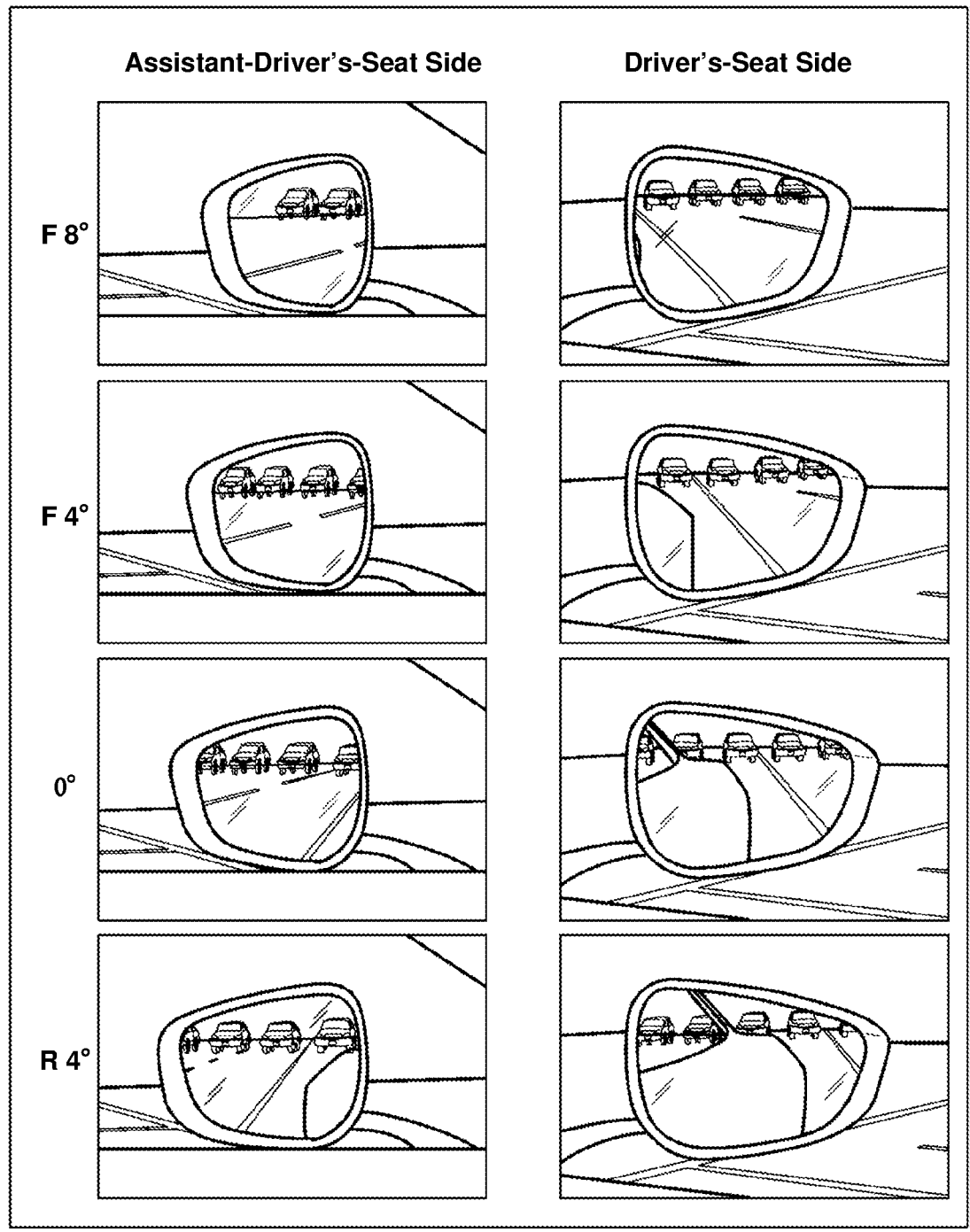
FIG. 19 is an explanatory diagram showing a state where a visual field through the mirror is changed by the mirror-face adjusting in the door mirror device shown in FIG. 1.

According to the above-described mirror-face adjusting, each visual field through the mirror in respective cases where the driver views, from the cabin inside, the door mirror positioned on a driver's-seat side and the other mirror positioned on an assistant-driver's-seat side when the vehicle is parked changes as shown in FIG. 19. Specifically, compared with the visual field in a case where the θ1 degrees corresponds to 0° in FIG. 19 which corresponds to the mirror-use position P1, in a case where +θ1 (i.e., forward-side θ1) degrees corresponds to F4° or F8° (i.e., the door mirror 2 is inclined forwardly from the set position by 4 degrees or 8 degrees), a wide range of rearward visual field which is outwardly, in the vehicle width direction, far from a vehicle-body rear portion is obtained. Meanwhile, in a case where −θ1 (i.e., rearward-side θ1) degrees corresponds to R4° (i.e., the door mirror 2 is inclined rearwardly by 4 degrees), a range of rearward visual field which is close to the vehicle-body rear portion is obtained. Accordingly, the driver can obtain the desired range of rearward visual field by the mirror-face adjusting. For example, the driver can obtain the wide rearward visual field which is outwardly, in the vehicle width direction, far from the vehicle body during the vehicle traveling, whereas the driver can obtain the rearward visual field which is close to the vehicle-body rear portion while the driver moves back the vehicle to a garage.

Features of Present Embodiment

[1]

The door mirror device of the present embodiment is the door mirror device of the side door 1 of the vehicle. This door mirror device comprises the door-mirror body portion 11 provided with the mirror 14 to obtain the rearward visual field of the vehicle, the mirror base 12 having the tip-end portion 12b fixed to the door-mirror body portion 11 and the base-end portion 12a provided away from the tip-end portion 12b, the rotational support axis 24 connected to the base-end portion 12a of the mirror base 12 and rotatably supporting the door-mirror body portion 11 and the mirror base 12 between the mirror-use position P1 where the mirror 14 is visible from the cabin inside and the mirror-storage position P2 which is located on the inward side, in the vehicle width direction, of the mirror-use position P1, the electromotive rotational unit 13 provided to rotate the door-mirror body portion 11 and the mirror base 12 between the mirror-use position P1 and the mirror-storage position P2 by the rotation around the axis line of the rotational support axis 24, and the control portion 41 to control the electromotive rotational unit 13.

In this door mirror device, the electromotive rotational unit 13 is provided inside the side door 1. Further, the control portion 41 controls the electromotive rotational unit 13 such that the door-mirror body portion 11 and the mirror base 12 are rotated from the mirror-use position P1 to the mirror-storage position P2 when the storage active signal to start the storage operation is inputted, the door-mirror body portion 11 and the mirror base 12 are rotated from the mirror-storage position P2 to the mirror-use position P1 when the deployment active signal to start the deployment active operation is inputted, and the door-mirror body portion 11 and the mirror base 12 are rotated in the prescribed minute (small) range centered at the mirror-use position P1 so as to change the angle of the mirror 14 when the mirror-face adjusting signal to adjust the mirror face is inputted.

According to this device, the electromotive rotational unit 13 rotates the mirror base 12 together with the door-mirror base portion 11 from the mirror-use position P1 to the mirror-storage position P2 in the door mirror device which comprises the door-mirror body portion 11 provided with the mirror 14 and the mirror base 12 having the tip-end portion 12b fixed to the door-mirror body portion 11. Therefore, in a state where the door-mirror body portion 11 and the mirror base 12 are rotated to the mirror-storage position P1, since respective protrusion quantities of the door-mirror body portion 11 and the mirror base 12 which protrude, in the vehicle width direction Y, from the side face of the side door 1 can be made small, so that the vehicle width can be properly minimized.

Further, since the electromotive rotational unit 13, which is a heavy object in the door mirror device, is provided inside the side door 1, the vertical moment generated at the door mirror which is caused by a road-surface input during the vehicle traveling (i.e., vibrations or outer forces which are mainly generated in the vertical direction Z, which may be caused by an unevenness (concave/convex) of the road surface) can be decreased, so that the vibrations of the mirror can be suppressed.

Moreover, since the electromotive rotational unit 13 is provided inside the side door 1, the longitudinal width of the door-mirror body portion 11 can be shortened compared with the conventional door-mirror device in which the electromotive rotational unit 13 is stored inside the door-mirror body portion 11, so that the visibility from the cabin inside can be improved.

Additionally, the control portion 41 controls the electromotive rotational unit 13 such that the door-mirror body portion 11 and the mirror base 12 are rotated in the prescribed minute range centered at the mirror-use position P1 so as to change the angle of the mirror 14 when the mirror-face adjusting signal is inputted. Thereby, the mirror-face adjusting, in the horizontal direction, by means of the electromotive rotational unit 13 becomes possible, so that the mirror-face adjusting unit which is conventionally provided at the door-mirror body portion 11 can be simplified.

[2]

In the door mirror device of the present embodiment, since the electromotive rotational unit 13 is arranged inside the side door 1, the electromotive rotational unit 13 can be protected from a foreign substance or the like which exist in the vehicle outside by the door panel 3 constituting the outside face of the side door 1. Herein, the electromotive rotational unit 13 may be positioned outside of the side door 1, but in this case, a large cover member to protect the electromotive rotational unit 13 or the like are required.

[3]

In the door mirror device of the present embodiment, the door mirror device further comprises the memory portion 45 (see FIG. 16) to memorize the positional information relating to the position of the door-mirror body portion 11 and the mirror base 12 after the door-mirror body portion 11 and the mirror base 12 have been rotated by the electromotive rotational unit 13 in the prescribed minute range so as to change the angle of the mirror when the mirror-face adjusting signal is inputted to the control portion 41.

The control portion 41 controls the electromotive rotational unit 13 such that the door-mirror body portion 11 and the mirror base 12 are located at the position corresponding to the positional information memorized by the memory portion 45 when the door-mirror body portion 11 and the mirror base 12 are rotated from the mirror-storage position P2 to the mirror-use position P1 according to the input of the deployment active signal in a state where the door-mirror body portion 11 and the mirror base 12 take the mirror-storage position P2 (see the steps S6-S10 in FIG. 17).

According to this device, the positional information relating to the position of the door-mirror body portion 11 and the mirror base 12 when the mirror-face adjusting is conducted is previously memorized by the memory portion 45, and when the deployment active signal is inputted next time, the control portion 41 controls the electromotive rotational unit 13 such that the door-mirror body portion 11 and the mirror base 12 are located at the position corresponding to the positional information memorized by the memory portion 41. This can save time and trouble for user's adjustment of the mirror face at each time of the mirror deployment, thereby improving the user convenience.

[4]

In the door mirror device of the present embodiment, the control portion 41 controls the electromotive rotational unit 13 such that the door-mirror body portion 11 and the mirror base 12 are returned to the position corresponding to the positional information memorized by the memory portion 45 in a case where the position of the door-mirror body portion 11 and the mirror base 12 is changed without being driven by the electromotive rotational unit 13 (see the steps S22-S26 in FIG. 16).

According to this device, the door-mirror body portion 11 can be automatically restored to its original position which is the position before its rotation in a case where the door-mirror body portion 11 is rotated involuntarily, such as a case where an external force is applied to the door-mirror body portion 11. Consequently, it is unnecessary to increase a rotational resistance against the external force to rotate the door-mirror body portion 11 like the conventional electromotive rotational unit 13, so that the rotational resistance of the electromotive rotational unit 13 can be properly small.

[5]

In the door mirror device of the present embodiment, the above-described prescribed minute range corresponds to the range of ±5 degrees centered at the mirror-use position P1. According to this device, the driver can properly adjust the mirror face within a range where the vehicle body in parking or a lane during vehicle traveling are visible for the driver through the mirror 14.

[6]

In the door mirror device of the present embodiment, the rotational support axis 24 is fixed to the base-end portion 12a of the mirror base 12 and configured to be rotatable around the axis line of the rotational support axis 24 together with the mirror base 12 by receiving the rotational drive force of the electromotive rotational unit 13. According to this device, since the mirror base 12 can be rotated by rotating the rotational support axis 24 by means of the rotational drive force of the electromotive rotational unit 13, the door mirror device is made properly simple.

[7]

In the door mirror device of the present embodiment, the electromotive rotational unit 13 (specifically, the motor 32, the reduction gear 33, the torque limiter 34, the output axis 35, and the rotational-number sensor 38 which are primary structural elements of the electromotive rotational unit 13) is arranged on the axis line of the rotational support axis 24. According to this device, since the electromotive rotational unit 13 is arranged on the axis line of the rotational support axis 24, a system structure of drive-force transmission from the electromotive rotational unit 13 to the rotational support axis 24 can be made simple and compact. Thereby, arranging the electromotive rotational unit 13 in the space inside the side door 1 becomes possible.

[8]

In the door mirror device of the present embodiment, the penetration hole 26 where the rotational support axis 24 passes is formed at the door panel 3 which constitutes the outside face of the side door 1. The door mirror device further comprises the cover member 27 which covers the gap between the penetration hole 26 and the rotational support axis 24. According to this device, since the cover member 27 covers the gap between the penetration hole 26 and the rotational support axis 24, appearance of the vehicle is improved and also water can be prevented from coming into the inside of the door panel 3 through the above-described gap.

[9]

In the door mirror device of the present embodiment, the electromotive rotational unit 13 is fixed to the beltline reinforcement 21 as a frame member which is provided inside the side door 1 and constitutes the frame of the side door 1. According to this device, the support rigidity of the electromotive rotational unit 13 is improved.

[10]

In the door mirror device of the present embodiment, the beltline reinforcement 21 which extends in the vehicle longitudinal direction X along the beltline BL of the window lower-end edge of the side door 1 is adopted as the frame member. According to this device, the above-described door mirror device can be widely used at the conventional door device by fixing the electromotive rotational unit 13 to the beltline reinforcement 21 which is generally used at the conventional door device.

[11]

In the door mirror device of the present embodiment, the beltline reinforcement 21 is made of the aluminum-made extrusion material. According to this device, since the beltline reinforcement 21 is made of the aluminum-made extrusion material, securement of the support rigidity of the electromotive rotational unit 13 and light weight of the vehicle can be compatibly attained.

[12]

In the door mirror device of the present embodiment, as shown in FIG. 13, the door-mirror body portion 11 is configured such that the inner face 11b of the door-mirror body portion 11 which faces the side door 1 is inclined toward the vehicle outside relative to the imaginary line L1 which passes through the inner-end portion 11a of the door-mirror body portion 11 perpendicularly to the surface of the mirror 14 in the plan view in the mirror-use position P1.

Accordingly, since the door-mirror body portion is configured such that the inner face 11b of the door-mirror body portion 11 is inclined toward the vehicle outside relative to the imaginary line L1 perpendicular to the surface of the mirror 14 taking the mirror-use position P1, the visual field from the cabin inside is not interrupted by the inner face 11b of the door-mirror body portion 11. Consequently, the visibility from the cabin inside is secured at the maximum, thereby improving the visibility further.

[13]

In the door mirror device of the present embodiment, as shown in FIG. 13, the door-mirror body portion 11 taking the mirror-use position P1 is configured such that the width, in the longitudinal direction X, of the door-mirror body portion 11 becomes narrower from the middle position, in the vehicle width direction Y, of the door-mirror body portion 11 toward the inner-end portion 11a which is positioned on the side of the side door 1 in the vehicle width direction Y.

According to this device, since the door-mirror body portion 11 taking the mirror-use position P1 is configured such that the width, in the longitudinal direction X, of the door-mirror body portion 11 becomes narrower from the middle position, in the vehicle width direction Y, of the door-mirror body portion 11 toward the inner-end portion 11a in the vehicle width direction Y, the visual field from the cabin inside is not interrupted by the inner face 11b of the door-mirror body portion 11. Consequently, the visibility from the cabin inside is secured at the maximum, thereby improving the visibility further.

Modified Examples

[A]

While the door mirror device of the above-described embodiment is configured such that the rotational support axis is provided in the upright state and the minute mirror-face adjusting in the horizontal direction is possible, the present invention is not limited to this device.

Figure 20A:
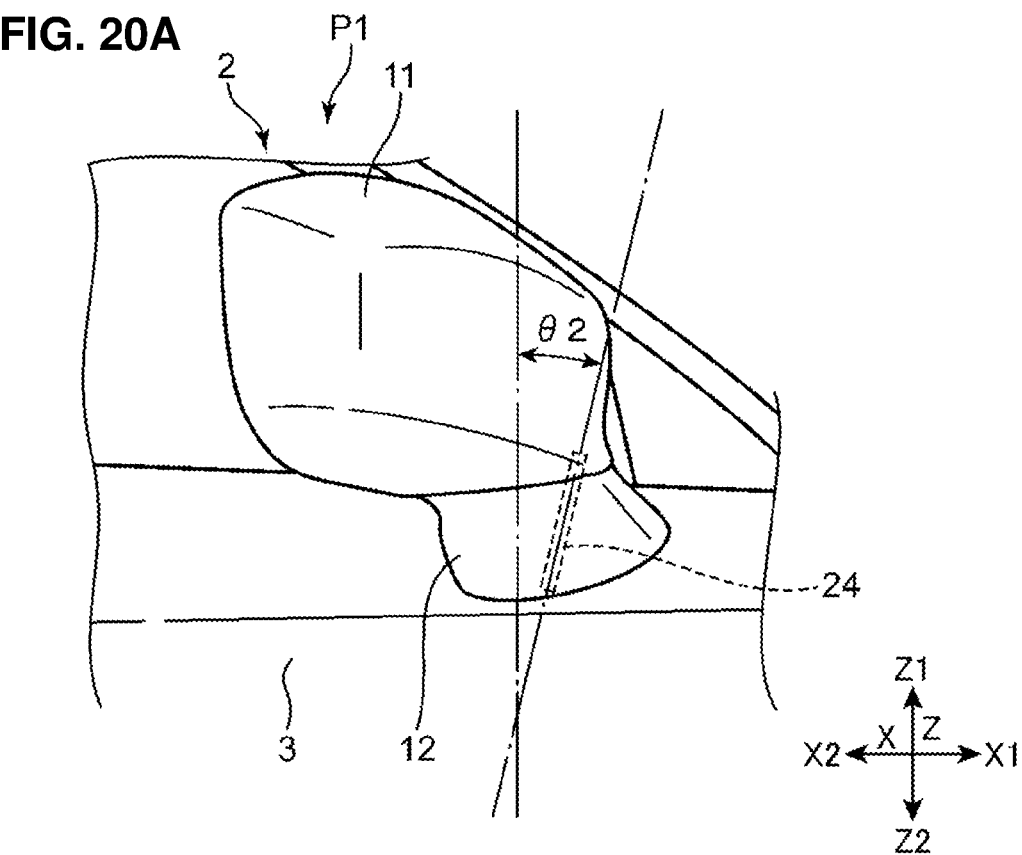
FIGS. 20A and 20B are views of a door mirror which is inclined forwardly and outwardly in a door mirror device according to anther embodiment of the present invention.
Figure 20B:
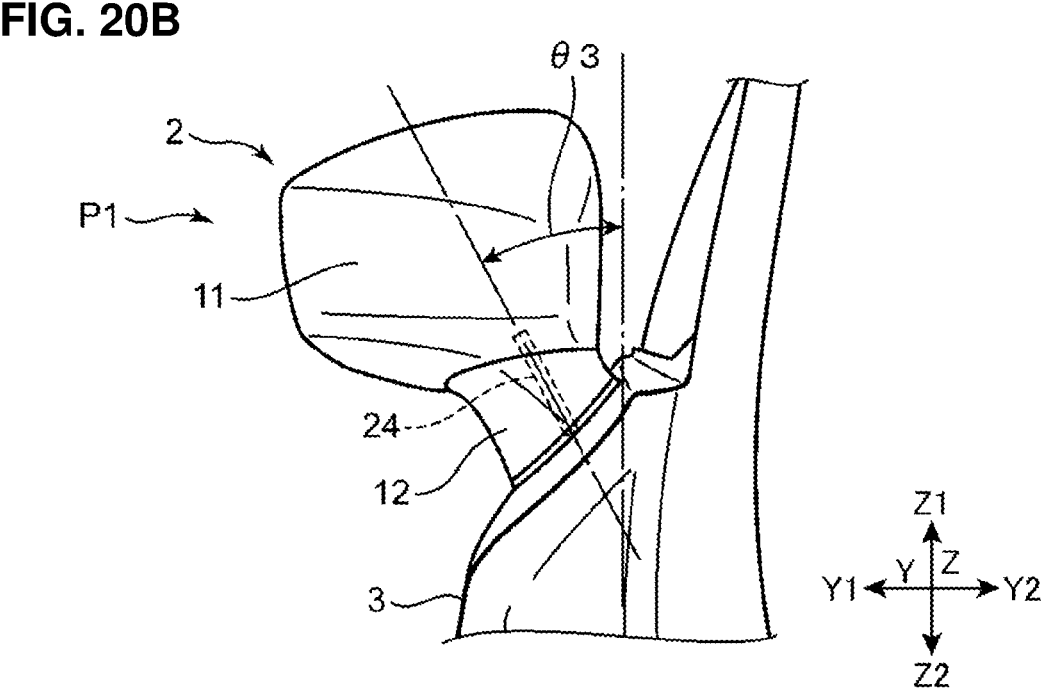

As a modified example of the present invention, as shown in FIGS. 20A and 20B, in order to make the minute mirror-face adjusting not only in the horizontal direction but in the vertical direction, the rotational support axis 24 may be provided to be inclined by θ2 degrees such that its upper side is located on a vehicle forward side X1 as it goes toward an upper side Z1 (i.e., forwardly inclined) and also be inclined by θ3 degrees such that its upper side is located on a vehicle outward side Y1 as it goes toward the upper side Z1 (i.e., outwardly inclined).

According to this device, the minute mirror-face adjusting in the vertical direction Z as well as in the horizontal direction can be attained only by rotating the door-mirror body portion 11 and the mirror base 12 around the axis line of the rotational support axis 24. That is, the mirror-face adjusting in the vertical direction can be the minimum. Further, an adjusting degree in the vertical direction Z in the mirror-face adjusting can be small, so that a movable range of the mirror 14 becomes so small that the door-mirror body portion 11 can be made properly thin (compact).

As shown in the modified example in FIGS. 20A and 20B, since the mirror-face adjusting in the vertical direction Z is available only by rotating the door mirror 2 by inclining he rotational support axis 24 forwardly and outwardly, the rearward visual field which is poisoned on a further downward side Z2 can be obtained just by rotating the door mirror 2 forwardly from the mirror-use position P1 (set position).

Figure 21:
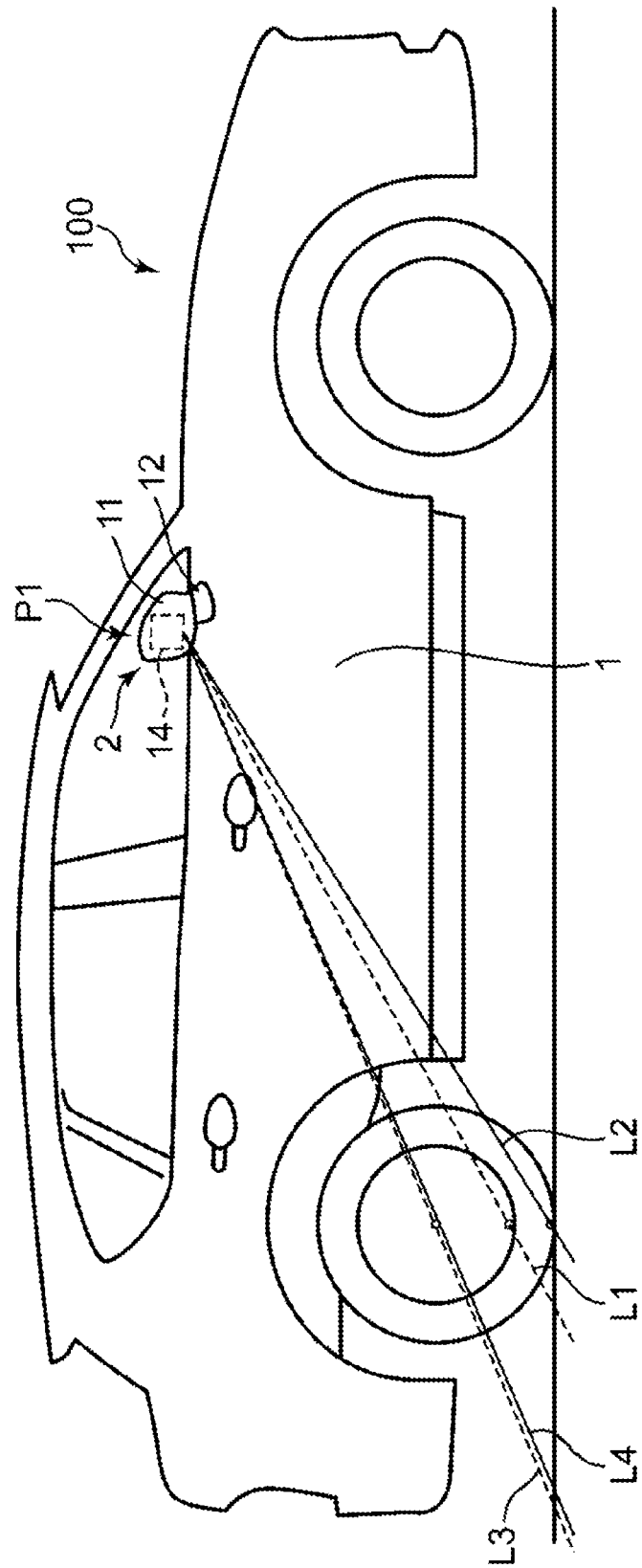
FIG. 21 is explanatory diagrams showing each position which is viewed at the lowermost position through a door mirror having an inclination and a door mirror having no inclination in respective states where the mirror takes a mirror-use position and a forwardly-rotated position.

For example, in a case where the door mirror 2 of the modified example shown in FIGS. 20A and 20B is applied to an automobile shown in FIG. 21, since a lower end of the rearward visual field at the mirror-use position P1 (set position) is a line L1 and a lower end of the rearward visual field at the forwardly-rotated position lowers up to a position of a line L2 in FIG. 21, the further downward side Z2 can be obtained. Further, in a case of the door mirror having inclination (forwardly inclined+rearwardly inclined) shown in FIG. 22, it is apparent that the rearward visual field at the forwardly-rotated position is located below the rearward visual field at the mirror-use position P1 (set position). Accordingly, changing of the visual field in the vertical direction Z becomes possible by the rotation of the door mirror 2, so that the mirror-face adjusting in the vertical direction can be the minimum.

Meanwhile, in a case where the door mirror 2 with the upright-state rotational support axis 24 (i.e., not inclined forwardly nor outwardly) like the present embodiment shown in FIGS. 1-7 is applied, since a line L3 showing the lower end of the rearward visual field at the mirror-use position P1 (set position) and a line L4 showing the lower end of the rearward visual field at the forwardly-rotated position have the same position, it is apparent that the mirror-face adjusting in the vertical direction is not available. Further, when viewing the door mirror having no inclination (not inclined forwardly nor outwardly) shown in FIG. 22, it is apparent that the rearward visual field at the mirror-use position P1 (set position) and the rearward visual field at the forwardly-rotated position are substantially the same, so that the mirror-face adjusting in the vertical direction cannot be attained.

Figure 22:
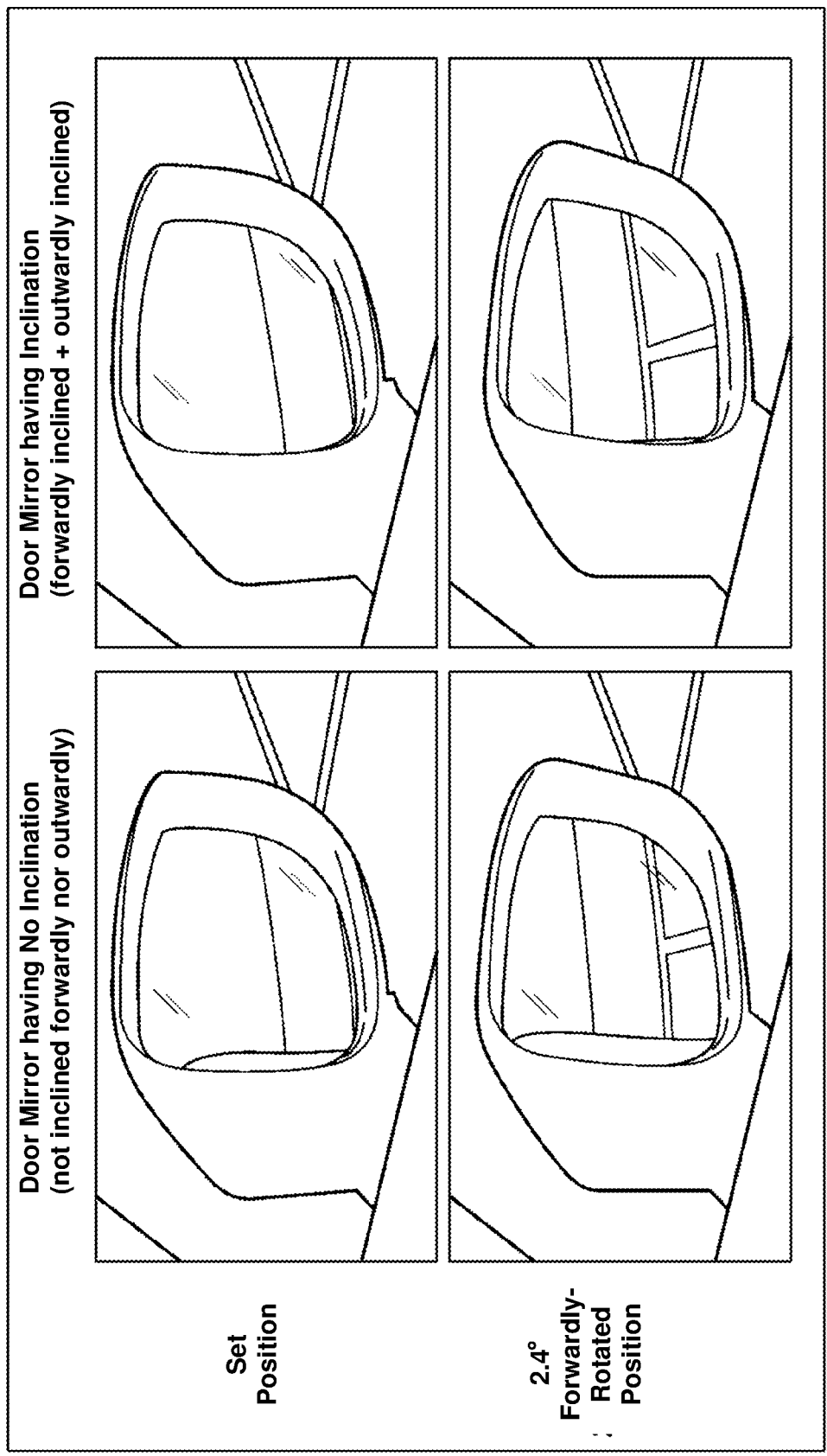
FIG. 22 is explanatory diagrams showing each visible area which is viewed through the door mirror having the inclination and the door mirror having no inclination, which are shown in FIG. 20, in respective states where the mirror takes the mirror-use position (set position) and a 2.4 degree forwardly-rotated position.

When viewing above-described verification results using FIGS. 21 and 22, it is understood that the minute mirror-face adjusting in the horizontal direction and also in the vertical direction Z can be attained by the modified example shown in FIGS. 20A and 20B in which the rotational support axis 24 is inclined forwardly and outwardly.

[B]

The mirror of the present invention includes any type as long as means for obtaining the rearward visual field is adopted. For example, the optical mirror 14 to obtain the rearward visual field by reflection of the light from the vehicle rearward side or a so-called digital mirror capable of obtaining the rearward visual field by means of a television camera provided at the door-mirror body portion 11 are included in the concept of the mirror of the present invention.

What is claimed is:

1. A door mirror device of a side door of a vehicle, comprising:
   a door-mirror body portion provided with a mirror to obtain a rearward visual field of the vehicle;
   a mirror base having a tip-end portion fixed to the door-mirror body portion and a base-end portion provided away from the tip-end portion;
   a rotational support axis connected to the base-end portion of the mirror base and rotatably supporting the door-mirror body portion and the mirror base between a mirror-use position where the mirror is visible from a cabin inside and a mirror-storage position which is located on an inward side, in a vehicle width direction, of the mirror-use position;
   an electromotive rotational unit provided to rotate the door-mirror body portion and the mirror base between the mirror-use position and the mirror-storage position around an axis line of the rotational support axis; and
   a control portion to control the electromotive rotational unit,
   wherein said electromotive rotational unit is provided inside the side door, and said control portion controls said electromotive rotational unit such that said door-mirror body portion and said mirror base are rotated from said mirror-use position to said mirror-storage position when a storage active signal to start a storage operation is inputted, said door-mirror body portion and said mirror base are rotated from said mirror-storage position to said mirror-use position when a deployment active signal to start a deployment active operation is inputted, and said door-mirror body portion and said mirror base are rotated in a prescribed minute range centered at the mirror-use position so as to change an angle of the mirror when a mirror-face adjusting signal to adjust a mirror face is inputted.

2. The door mirror device of claim 1, wherein said rotational support axis is provided to be inclined such that an upper side thereof is located on a vehicle forward side and on an outward side in a vehicle width direction.

3. The door mirror device of claim 2, further comprising a memory portion to memorize positional information relating to a position of said door-mirror body portion and said mirror base after the door-mirror body portion and the mirror base have been rotated by said electromotive rotational unit in said prescribed minute range so as to change the angle of the mirror when said mirror-face adjusting signal is inputted to said control portion,
   wherein said control portion controls the electromotive rotational unit such that the door-mirror body portion and the mirror base are located at a position corresponding to said positional information memorized by said memory portion when the door-mirror body portion and the mirror base are rotated from said mirror-storage position to said mirror-use position according to an input of said deployment active signal in a state where the door-mirror body portion and the mirror base take the mirror-storage position.

4. The door mirror device of claim 3, wherein said control portion controls said electromotive rotational unit such that said door-mirror body portion and said mirror base are returned to a position corresponding to said positional information memorized by said memory portion in a case where a position of the door-mirror body portion and the mirror base is changed without being driven by the electromotive rotational unit.

5. The door mirror device of claim 4, wherein said prescribed minute range corresponds to a range of ±5 degrees centered at said mirror-use position.

6. The door mirror device of claim 5, wherein said rotational support axis is fixed to the base end portion of said mirror base and rotatable together with the mirror base around the axis line of said rotational support axis when receiving a rotational drive force of said electromotive rotational unit.

7. The door mirror device of claim 1, further comprising a memory portion to memorize positional information relating to a position of said door-mirror body portion and said mirror base after the door-mirror body portion and the mirror base have been rotated by said electromotive rotational unit in said prescribed minute range so as to change the angle of the mirror when said mirror-face adjusting signal is inputted to said control portion,
   wherein said control portion controls the electromotive rotational unit such that the door-mirror body portion and the mirror base are located at a position corresponding to said positional information memorized by said memory portion when the door-mirror body portion and the mirror base are rotated from said mirror-storage position to said mirror-use position according to an input of said deployment active signal in a state where the door-mirror body portion and the mirror base take the mirror-storage position.

8. The door mirror device of claim 1, wherein said prescribed minute range corresponds to a range of ±5 degrees centered at said mirror-use position.

9. The door mirror device of claim 1, wherein said rotational support axis is fixed to the base end portion of said mirror base and rotatable together with the mirror base around the axis line of said rotational support axis when receiving a rotational drive force of said electromotive rotational unit.

* * * * *